United States Patent
Katayama et al.

(10) Patent No.: US 8,660,049 B2
(45) Date of Patent: Feb. 25, 2014

(54) WIRELESS COMMUNICATION SYSTEM, BASE STATION AND NETWORK CONTROL APPARATUS

(75) Inventors: Rintaro Katayama, Fujisawa (JP); Satoshi Tamaki, Yokohama (JP); Tomonori Yamamoto, Fujisawa (JP); Hirotake Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 301 days.

(21) Appl. No.: 13/015,810

(22) Filed: Jan. 28, 2011

(65) Prior Publication Data
US 2011/0211519 A1 Sep. 1, 2011

(30) Foreign Application Priority Data
Feb. 26, 2010 (JP) ................................ 2010-041282

(51) Int. Cl.
H04H 20/71 (2008.01)
H04J 3/26 (2006.01)

(52) U.S. Cl.
USPC .......................................... 370/312; 370/432

(58) Field of Classification Search
USPC .......................................................... 370/312
See application file for complete search history.

(56) References Cited

U.S. PATENT DOCUMENTS

| | | | | |
|---|---|---|---|---|
| 8,005,044 B2* | 8/2011 | Kim | | 370/329 |
| 2006/0013325 A1* | 1/2006 | Agrawal et al. | | 375/260 |
| 2006/0160549 A1 | 7/2006 | Sato et al. | | |
| 2007/0076807 A1* | 4/2007 | Jin et al. | | 375/260 |
| 2008/0043817 A1* | 2/2008 | Beems Hart et al. | | 375/135 |
| 2009/0010344 A1* | 1/2009 | Jalil et al. | | 375/260 |
| 2009/0109939 A1* | 4/2009 | Bhushan et al. | | 370/337 |
| 2009/0252077 A1* | 10/2009 | Khandekar et al. | | 370/312 |
| 2009/0286468 A1* | 11/2009 | Kim et al. | | 455/3.03 |
| 2010/0080154 A1* | 4/2010 | Noh et al. | | 370/310 |
| 2010/0173637 A1* | 7/2010 | Damnjanovic et al. | | 455/447 |

FOREIGN PATENT DOCUMENTS

| | | |
|---|---|---|
| JP | 2001-218245 | 8/2001 |
| JP | 2009-182944 | 8/2009 |

OTHER PUBLICATIONS

Alcatel-Lucent Shanghai et al., "Service multiplexing and signaling for eMBMS", 3GPP TSG-RAN WG3 #64, May 4-8, 2009, pp. 1-5.
Ericsson: "MCCH Content for eMBMS Rel-9", 3GPP TSG-RAN WG2 #66m May 4-8, 2009, pp. 1-4.
LTE Evolved Universal Terrestrial Radio Access (E-ULTRA) and Evolved Universal Terrestrial Radio Access Network; vol. 3GPP RAN 2, No. v9.2.0, Feb. 1, 2010.

(Continued)

*Primary Examiner* — Gerald Smarth
(74) *Attorney, Agent, or Firm* — Antonelli, Terry, Stout & Kraus, LLP.

(57) ABSTRACT

In a time slot in which a first base station for performing a multicast transmission executes the multicast transmission, a second base station which does not perform the multicast transmission does not perform a unicast data transmission. The time slot in which the first base station performs the multicast transmission is notified to the second base station from a multicast control apparatus for performing scheduling of the multicast transmission to the first base station. Information to receive the multicast transmission is notified from the second base station to a terminal connected to the second base station.

12 Claims, 28 Drawing Sheets

(56) References Cited

OTHER PUBLICATIONS

3GPP TS 36.300 V9.1.0 (Sep. 2009), $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

3GPP TS 36.300 V9.1.0, 4.6 Support of HeNBs.

Office Action in Japanese Patent Application JP-2010-041282, mailed Jun. 25, 2013, (in Japanese, 2 pgs.); [partial English language translation, 1 pg.].

* cited by examiner

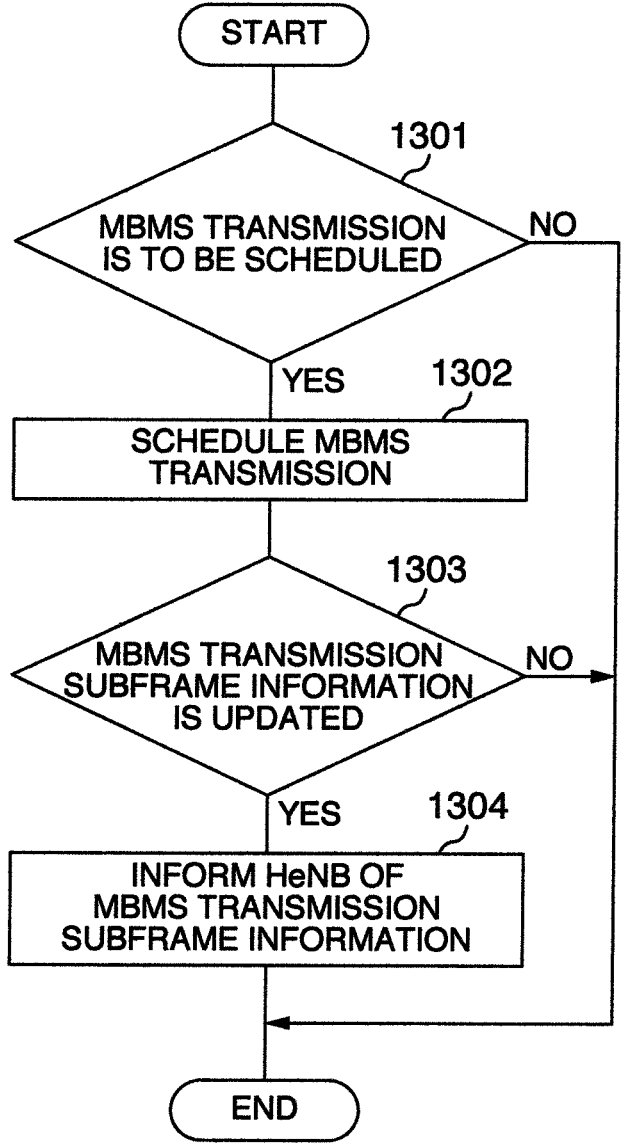

FIG.14

MCH SUBFRAME INFORMATION TABLE

321

| CLASSIFICATION | PARAMETER | VALUE | |
|---|---|---|---|
| MCH COMMON INFORMATION1 (MBSFN Area Subframe Allocation) | Radio Frame Allocation Period | 8 [radio frame] | ~1401 |
| | Radio Frame Offset | 3 [radio frame] | ~1402 |
| | Subframe Allocation (Bitmap) | "111000" | ~1403 |
| MCH COMMON INFORMATION2 | Common Allocation Period | 16 [radio frame] | ~1404 |
| MCH DEDICATED INFORMATION (MCH0) | Subframe Allocation End | 2 | ~1405 |
| | MSAP Occasion Period | 32 [radio frame] | ~1406 |
| MCH DEDICATED INFORMATION (MCH1) | Subframe Allocation End | 5 | ~1405 |
| | MSAP Occasion Period | 32 [radio frame] | ~1406 |

FIG.18
MBSFN SUBFRAME INFORMATION TABLE
| CLASSIFICATION | PARAMETER | VALUE | |
|---|---|---|---|
| MBSFN Subframe INFORMATION | Radio Frame Allocation Period | 8 [radio frame] | ~1801 |
| | Radio Frame Offset | 3 [radio frame] | ~1802 |
| | Subframe Allocation (Bitmap) | "111010" | ~1803 |
FIG.19
1902 — : SUBFRAME ALLOCATED AS MBSFN SUBFRAME
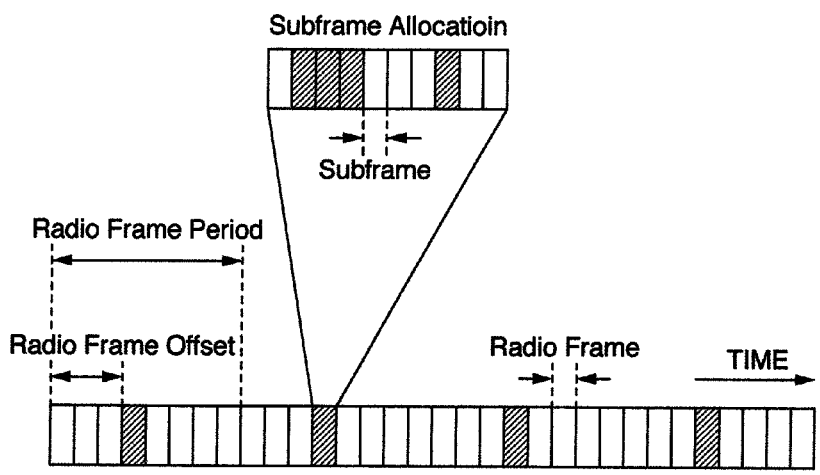
1901 — : RADIO FRAME INCLUDING MBSFN AREA SUBFRAME (S)

FIG.20

MCCH TRANSMISSION INFORMATION TABLE

| CLASSIFICATION | PARAMETER | VALUE | |
|---|---|---|---|
| MCCH TRANSMISSION INFORMATION | MBSFN Area ID | 0 | ~2001 |
| | Notification Indicator | 0 | ~2002 |
| | MCCH Repetition Period | 128 [radio frame] | ~2003 |
| | MCCH Offset | 2 [radio frame] | ~2004 |
| | MCCH Modification Period | 512 [radio frame] | ~2005 |
| | MCCH Subframe Allocation (Bitmap) | "100000" | ~2006 |
| | Signalling MCS | 2 | ~2007 |

FIG.21

Notification TRANSMISSION INFORMATION TABLE

| CLASSIFICATION | PARAMETER | VALUE | |
|---|---|---|---|
| Notification TRANSMISSION INFORMATION | Notification Repetition Coefficient | 2 | ~2101 |
| | Notification Offset | 0 [radio frame] | ~2102 |
| | Notification Subframe | 4 | ~2103 |

FIG.22

Notification AREA INFORMATION TABLE

| CLASSIFICATION | PARAMETER | VALUE | |
|---|---|---|---|
| MCCH UPDATES INFORMATION | MBSFN Area ID (Bitmap) | "10100000" | ~2201 |

FIG.30

DESIRED MBMS SERVICES INFORMATION SUMMARY TABLE

| SERVICE INDEX | SERVICE NAME |
|---|---|
| 1 | xxxx |
| 4 | yyyy |
| 5 | zzzz |

WIRELESS COMMUNICATION SYSTEM, BASE STATION AND NETWORK CONTROL APPARATUS

INCORPORATION BY REFERENCE

The present application claims priority from Japanese patent application JP-2010-041282 filed on Feb. 26, 2010, the content of which is hereby incorporated by reference into this application.

BACKGROUND OF THE INVENTION

The invention relates to a wireless communication system and a radio base station apparatus and a network control apparatus constructing the wireless communication system.

In cellular wireless communication, an examination and a practical implementation of multicast services for broadcasting same information to a plurality of terminals are being progressed. Generally, a transmission of the multicast services is performed in the downlink, which is the direction from a base station to the terminal. Unlike a unicast system in which a dedicated radio resource is allocated to one terminal, in the multicast system, since a plurality of terminals share the same radio resource, use efficiency of the radio resource is improved. Further, by transmitting the same information from a plurality of base stations, the terminal uses the received signals from a plurality of base stations and can improve quality of the received signals.

In the multicast system using a plurality of base stations, an SFN (Single Frequency Network) by an OFDM (Orthogonal Frequency Division Multiplexing) signal has been examined. In the OFDM-SFN system, a plurality of base stations transmit a same radio signal by using a same frequency. The terminal does not need to separate the radio signal from each base station and it is sufficient to receive and demodulate a signal in which the radio signals from a plurality of base stations have been superposed.

In the standardization organization 3GPP, in an E-UTRA (Evolved Universal Terrestrial Radio Access) and an E-UTRAN (Evolved Universal Terrestrial Radio Access Network), a multicast system using the OFDM has been standardized. In "3GPP TS 36.300 V9.1.0, 15 MBMS", it has been disclosed as MBMS (Multimedia Broadcast and Multicast Services).

In the cellular wireless communication, a small base station has been examined in order to complement an area coverage. It is presumed that the small base station is disposed, particularly, in a home, an office, a commercial building, or the like and is connected to a dedicated network of a mobile network operator through an ISP (Internet Service Provider) line or the like. In such a small base station, since a cover area (cell) of a radio wave is narrower than that of the ordinary base station, the cover area of the ordinary base station is called a "macrocell", while the cover area of the foregoing small base station is called a "femto-cell".

In the standardization organization 3GPP, in the E-UTRA and the E-UTRAN, the femto-cell base station has been standardized. In "3GPP TS 36.300 V9.1.0, 4.6 Support of HeNBs", a femto-cell base station has been disclosed as an HeNB (Home E-UTRAN Node B).

In JP-A-2009-182944, in the E-UTRA and the E-UTRAN, an environment where a base station which executes only the unicast transmission, a base station which executes only the MBMS transmission, and a base station which executes both of the unicast transmission and the MBMS transmission exist mixedly has been disclosed.

SUMMARY OF THE INVENTION

In the multicast system, a plurality of base stations disposed in the area of the multicast services transmit the same information. However, all of the base stations in the area of the multicast services do not always participate in the multicast transmission. For example, a case where the femto-cell base station does not participate in the multicast transmission is possible.

Generally, whether or not the multicast services are received is determined based on a judgment of the terminal. In the femto-cell base station, since the cover area is narrower than that of the macrocell base station, the number of connected terminals is small. Therefore, a case where even if the femto-cell base station performed the multicast transmission, the terminals which receive the multicast services hardly exist or never exist in the femto-cell is possible. In such a case, there is a fear that communication resources of a line from a contents server of the multicast services to the femto-cell base station or radio resources between the femto-cell base station and the terminal are wasted in vain. Further, in the case where the femto-cell base station and the network of the mobile network operator are connected through a line of a relatively low rate such as an ADSL (Asymmetric Digital Subscriber Line) or the like, there is a possibility that a congestion of the line due to a large amount of contents of the multicast services occurs. To avoid this, it may be better that only the macrocell base station executes the multicast transmission and the femto-cell base station does not perform the multicast transmission.

In "3GPP TS 36.300 V9.1.0, 15 MBMS", although a communication interface has been specified between a multicast control apparatus (MCE: Multi-cell/Multicast Coordination Entity) which schedules the MBMS transmission and a base station (eNB: E-UTRAN Node B) and between a gateway (MBMS GW: MBMS Gateway) which distributes the contents of the MBMS services and the base station, those interfaces do not support the femto-cell base station (HeNB). That is, the HeNB executes only the unicast data transmission.

However, in the case where the femto-cell base station does not participate in the multicast transmission as mentioned above, the terminal which is connected to the femto-cell base station cannot use the multicast services.

In JP-A-2009-182944, a method whereby the terminal connected to the base station which executes only the unicast transmission performs the MBMS reception is not disclosed.

In consideration of the above problems, it is an object of the invention to provide multicast services to a terminal which can communicate with a plurality of base stations including a base station which does not participate in a multicast service transmission.

To solve at least one of the foregoing problems, according to an aspect of the invention, there is provided a communication system comprising: a first base station for executing a multicast transmission; and a second base station for communicating with a terminal, wherein when the first base station executes the multicast transmission, the second base station controls the communication with the terminal in a time slot corresponding to a time slot in which the multicast transmission is executed.

For example, the second base station which does not execute the multicast transmission does not executes the unicast transmission in the time slot corresponding to the time slot in which the multicast transmission is executed.

To solve at least one of the foregoing problems, according to another aspect of the invention, the time slot in which the first base station executes the multicast transmission is notified to the second base station from a multicast control apparatus which schedules the multicast transmission for the first base station.

To solve at least one of the foregoing problems, according to another aspect of the invention, information that is necessary for receiving the multicast transmission is notified from the second base station to the terminal connected to the second base station.

According to the aspect of the invention, an opportunity to receive the multicast services is provided to the terminal connected to the femto-cell base station which does not perform the multicast transmission.

Other objects, features and advantages of the invention will become apparent from the following description of the embodiments of the invention taken in conjunction with the accompanying drawings.

BRIEF DESCRIPTION OF THE DRAWINGS

FIG. 13 is a flowchart showing an MBMS transmission subframe information notification determinating process for deciding whether or not the MCE informs the HeNB of MBMS transmission subframe information;
FIG. 14 is an MCH subframe information table including the information which is notified from the MCE to the HeNB;
FIG. 18 is an MBSFN subframe information table including the information which is notified from the MCE to the HeNB;
FIG. 19 is a diagram showing an allocation of the MBSFN subframe;
FIG. 20 is an MCCH transmission information table including information which is notified from the HeNB to an HUE;
FIG. 21 is a Notification transmission information table including the information which is notified from the HeNB to the HUE;
FIG. 22 is a Notification area information table including the information which is notified from the HeNB to the HUE;
FIG. 30 is a Desired MBMS services information summary table held by the HeNB.

DETAILED DESCRIPTION OF THE INVENTION

Figure 1:
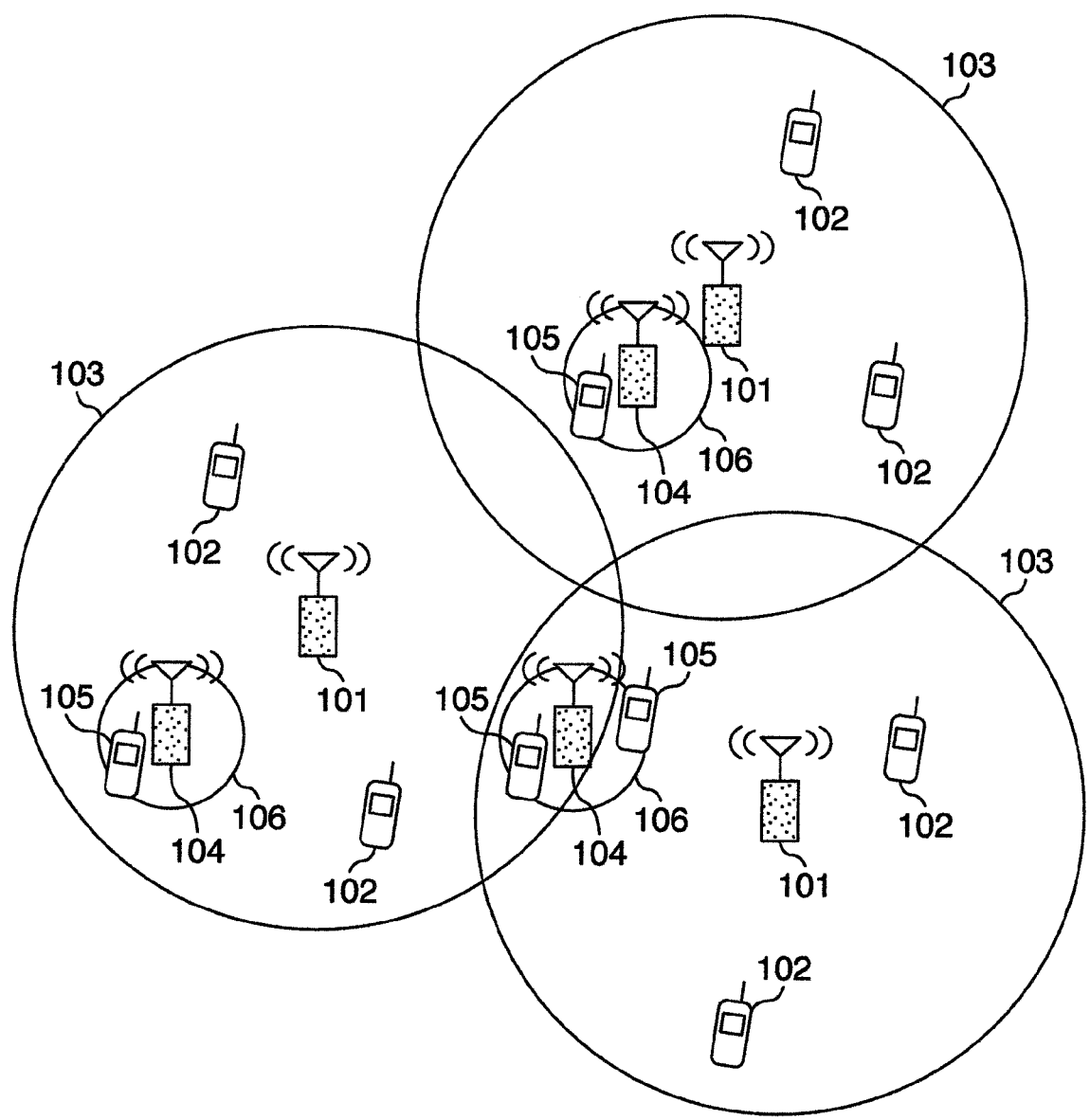
FIG. 1 is a diagram showing a relation between a macrocell and a femto-cell.

In the following embodiment, it will be divided into a plurality of sections or embodiments and described if it is necessary for convenience. However, they have a connection with each other and there is such a relation that one of them is a modification, details, a supplementary description, or the like of a part or all of the others unless otherwise specified. In the following embodiment, when mentioning the number of elements and the like (including the number, numerical values, amounts, ranges, and the like), excluding a case which is particularly specified, a case where they are obviously limited to the specific numbers in principle, and the like, they are not limited to such specific numbers but may be values which are equal to or larger than or smaller than the specific numbers.

Further, in the following embodiment, naturally, its component elements (including element steps and the like) are not always indispensable excluding a case which is particularly specified, a case where they are considered to be obviously indispensable in principle, and the like. Similarly, in the following embodiment, when mentioning shapes, positional relations, and the like of the component elements and the like, they incorporate elements whose shapes and the like are substantially analogous or similar to those of them and the like excluding a case which is particularly specified, a case where it is considered that they are not in principle, and the like. This is true of the foregoing numerical values and ranges.

The embodiment of the invention will be described in detail hereinbelow with reference to the drawings. In all drawings for describing the embodiment, the same members are indicated by the same reference numerals in principle and their repetitive explanation is omitted.

A communication system to which the embodiment is applied will be described in detail with reference to the drawings with respect to a case, as an example, where in a multicast transmission system (MBMS) in the E-UTRA and the E-UTRAN, a macrocell base station (MeNB: Macrocell eNB) which executes the MBMS transmission and a femto-cell base station (HeNB) which does not perform the MBMS transmission are disposed in an MBMS area.

FIG. 1 shows an example of a layout of an HeNB and an MeNB. An MeNB 101 constructs a macrocell 103 by its communication range and is connected to terminals 102. An HeNB 104 constructs a femto-cell 106 by its communication range and is connected to a terminal 105. The terminal 102 connected to the MeNB is called an MUE (Macrocell User Equipment). The terminal 105 connected to the HeNB is called an HUE (Home User Equipment).

Figure 2:
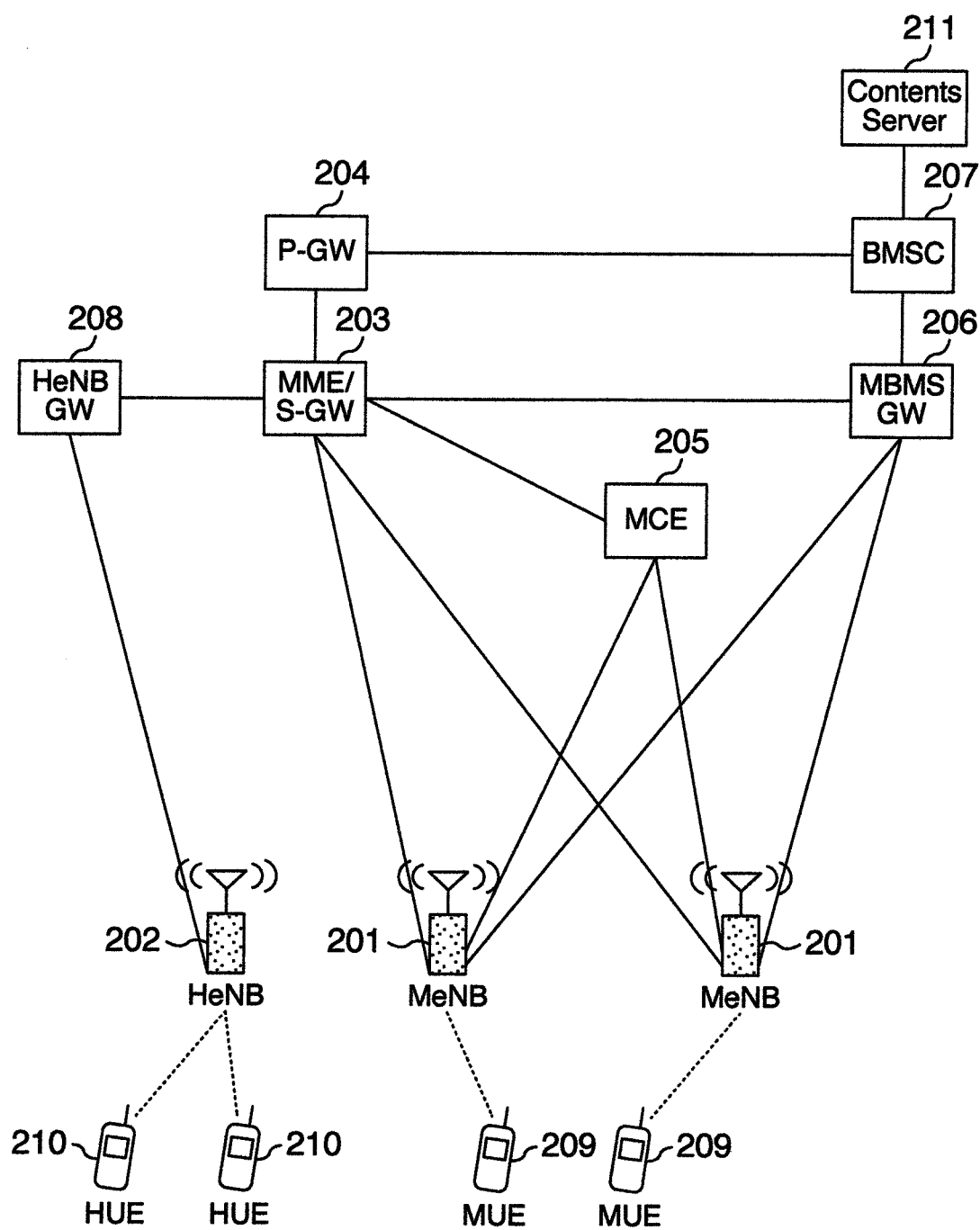
FIG. 2 is a diagram showing a logical architecture of a network.

FIG. 2 shows an example of a logical architecture of a network. The network in FIG. 2 is constructed by: MeNBs 201; an HeNB 202; an MME/S-GW (Mobility Management Entity/Serving Gateway) 203 for performing a mobility management of terminals (UE: User Equipment), a routing of a packet, and the like; a P-GW (Packet Data Network Gateway) 204 for transmitting and receiving the packet to/from an IP service network; an MCE 205 for performing a scheduling and the like of an MBMS transmission; an MBMS GW (Gateway) 206 for distributing MBMS service data to the MeNB; a BMSC (Broadcast Multicast Service Center) 207 for making an authentication and the like of the terminal which receives MBMS services; and an HeNB GW 208 for connecting a network apparatus such as an MME/S-GW or the like. The MeNBs 201, HeNB 202, and MCE 205 are connected through wired networks.

An MUE 209 is connected to the MeNB 201 through a radio link. An HUE 210 is connected to the HeNB 202 through a radio link. For example, as illustrated in the MeNB 101 and the HeNB 104 arranged in the macrocell 103 of the MeNB 101 in FIG. 1, the HeNB 202 is located in a macrocell of the MeNB 201 and the femto-cell 106 which can communicate with the HUE 210 is constructed. The BMSC 207 obtains the MBMS service data from an MBMS contents server 211 and distributes to a plurality of MeNBs 201 through the MBMS GW 206. The MeNB 201 wirelessly multicast-transmits the MBMS service data distributed from the MBMS GW 206 in accordance with MBMS scheduling information which is notified from the MCE 205.

Figure 3:
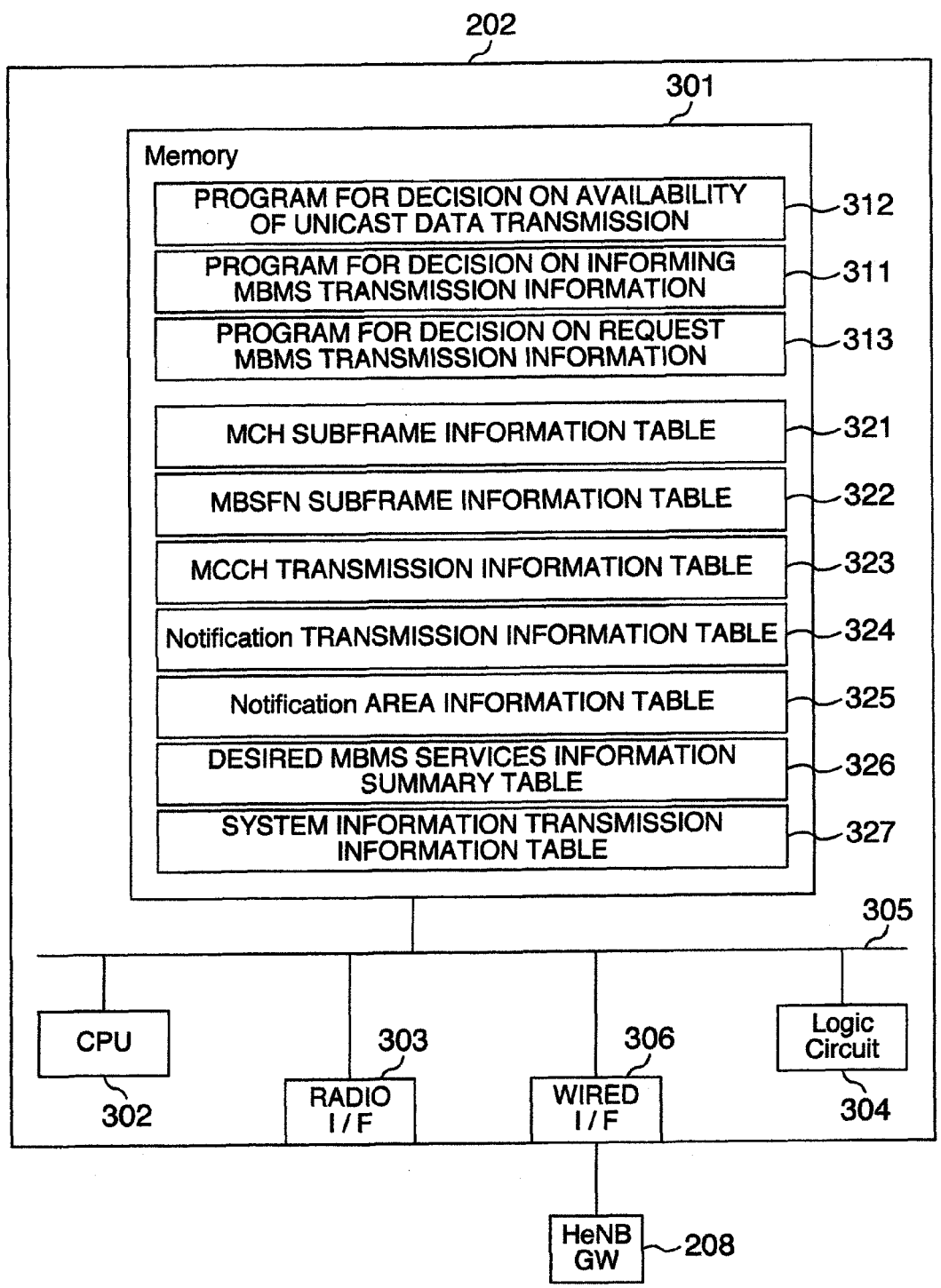
FIG. 3 is a diagram showing an example of a construction of a femto-cell base station (HeNB)

FIG. 3 shows a constructional example of the HeNB 202. The HeNB in FIG. 3 has a memory 301, a CPU 302, a radio interface (I/F) 303, a logic circuit 304, and a wired interface (I/F) 306 and they are connected through a bus 305, respectively. The following programs necessary for the HeNB 202 to transmit MBMS transmission timing to the HUE 210 are stored in the memory 301: that is, a program 312 for decision on availability of a unicast data transmission; a program 311 for decision on informing MBMS transmission information; and a program 313 for decision on a request for the MBMS transmission information. The following tables are stored in the memory 301: that is, an MCH subframe information table 321; an MBSFN subframe information table 322; an MCCH transmission information table 323; a Notification transmission information table 324; a Notification area information table 325; a Desired MBMS services information summary table 326; and a System information transmission information table 327. Detailed contents of each program and each table will be described hereinafter.

The CPU 302 reads out a program for deciding a suspension of the unicast transmission at the MBMS transmission timing from the memory 301 and executes it.

The HeNB is connected to a wired network by the wired interface 306 and communicates with the MCE 205 through the HeNB GW 208 or the MME/S-GW 203. The HeNB communicates with the HUE 210 by the radio interface 303 through an antenna. Further, the HeNB may communicate with the MeNB 201 by the radio interface 303 or the wired interface 306. The logic circuit 304 executes a process such as a turbo encoding and the like necessary for the wireless communication with the HUE 210 or the terminal 105.

Figure 4:
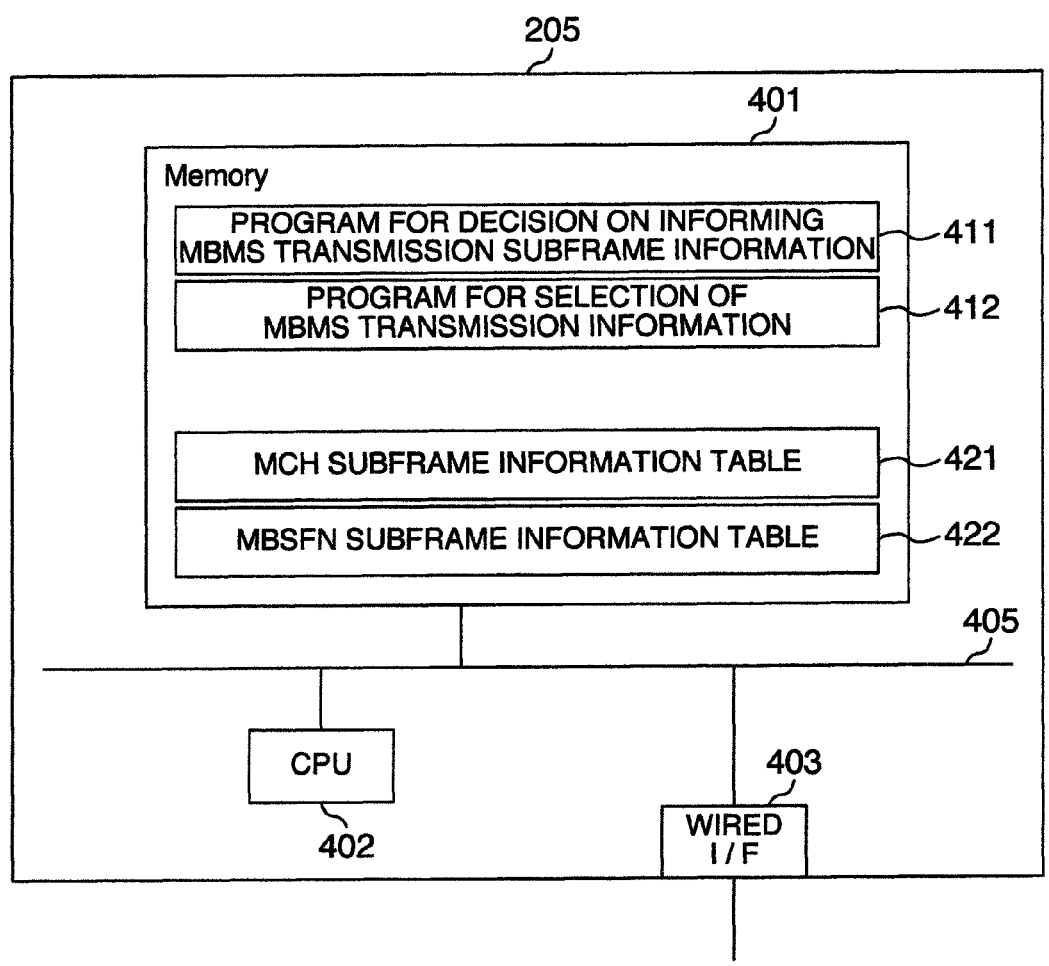
FIG. 4 is a diagram showing an example of a construction of a multicast control apparatus (MCE)

FIG. 4 is a constructional example of the MCE 205. The MCE 205 has a memory 401, a CPU 402, and a wired interface (I/F) 403 and they are connected through a bus 405, respectively. The following programs and tables which are necessary to manage the MBMS transmission timing are stored in the memory 401: that is, a program 411 for decision on informing MBMS transmission subframe information; a program 412 for selection of the MBMS transmission information; an MCH subframe information table 421; and an MBSFN subframe information table 422. Detailed contents of each program and each table will be described hereinafter.

The CPU 402 reads out the program such as scheduling of the MBMS transmission from the memory 401 and executes it. The MCE communicates with the HeNB 202 by the wired interface 403 through the NeNB GW 208. The MCE communicates with a network apparatus such as an MME/S-GW 203 or the like through the wired network as shown in FIG. 1 by the wired interface 403.

Figure 29:
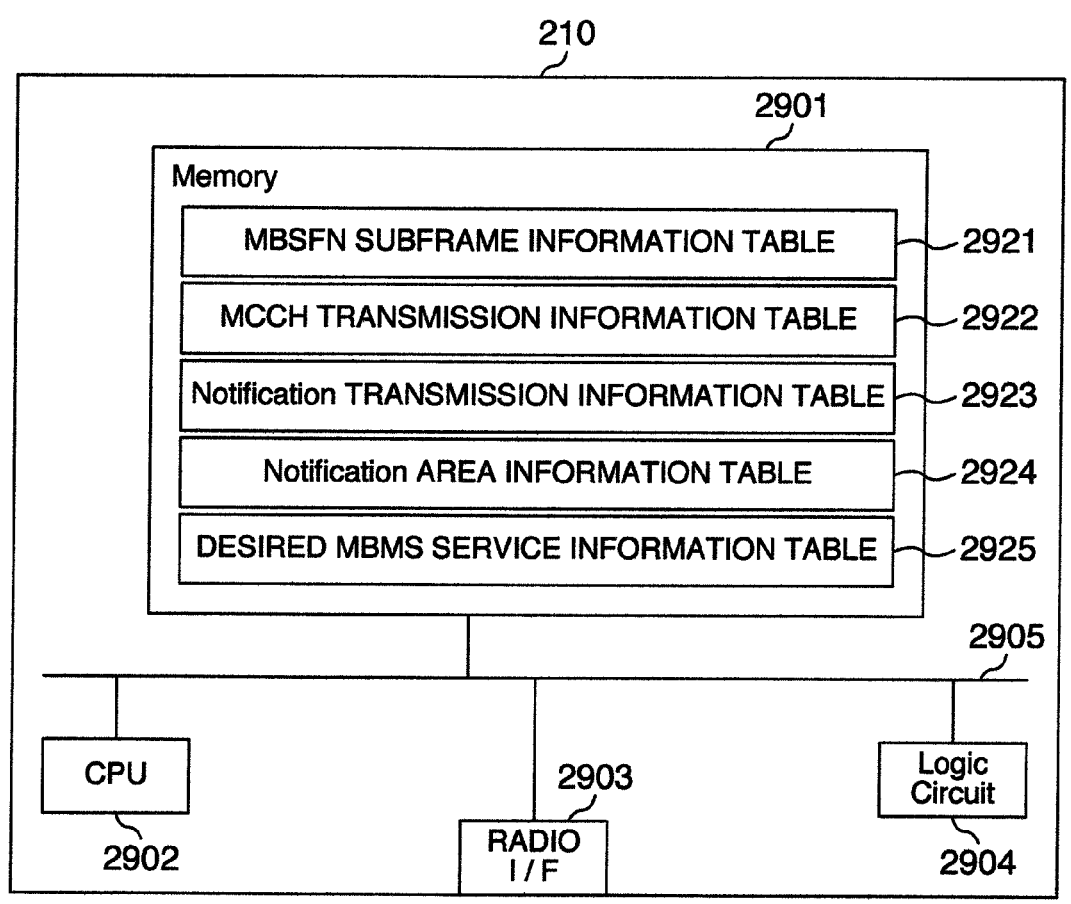
FIG. 29 is a diagram showing an example of a construction of a terminal (HUE)

FIG. 29 is a constructional example of the HUE 210. The HUE 210 has a CPU 2902, a memory 2901, a radio interface (I/F) 2903, and a logic circuit 2904 and they are connected through a bus 2905, respectively. The following information tables and programs which are necessary to transmit the MBMS transmission timing and the like are stored in the memory 2901: that is, an MBSFN subframe information table 2921; an MCCH transmission information table 2922; a Notification transmission information table 2923; a Notification area information table 2924; and a Desired MBMS service information table 2925. The CPU 2902 reads out the program such as an MBMS receiving process or the like from the memory 2901 and executes it. The HUE communicates with the HeNB 202 by the radio interface 2903 through an antenna. The logic circuit 2904 executes a process such as a turbo encoding or the like necessary for the wireless communication with the HeNB 202.

Figure 5:
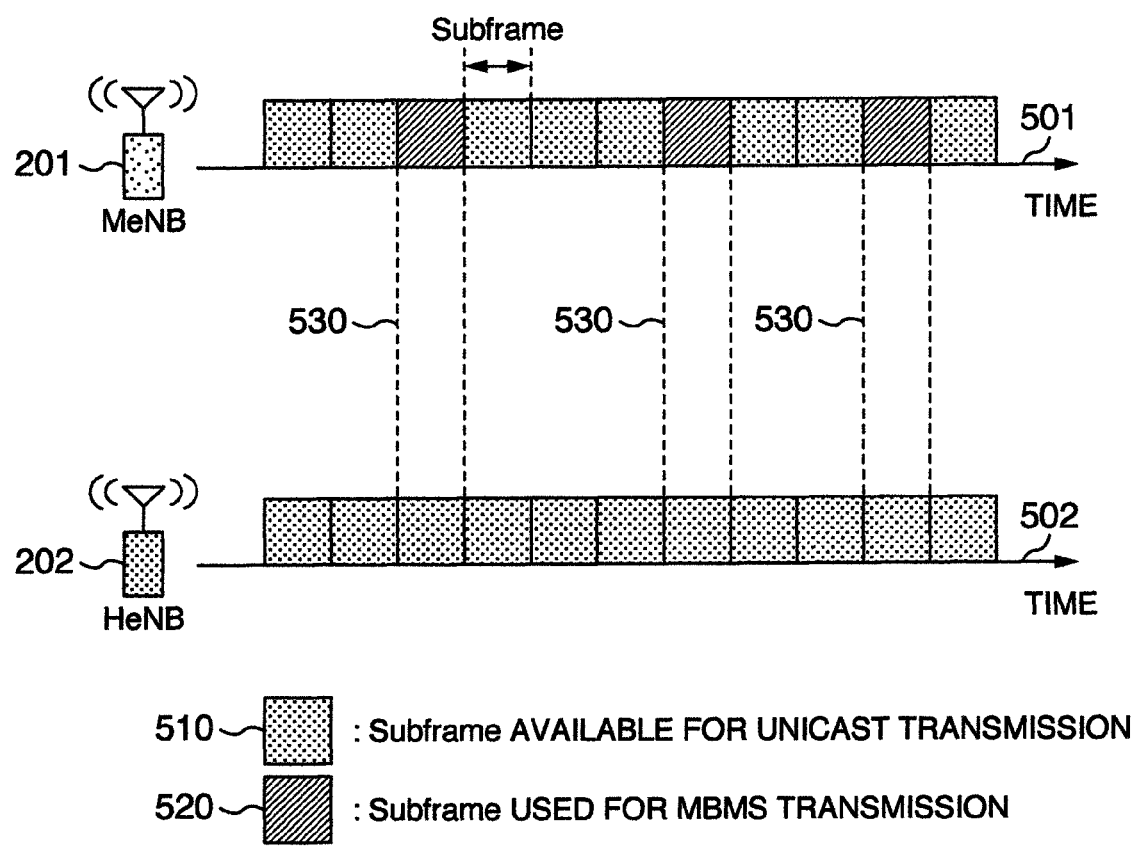
FIG. 5 is a time chart showing transmission timing of an MeNB and an HeNB irrespective of MBMS transmission timing.
Figure 6:
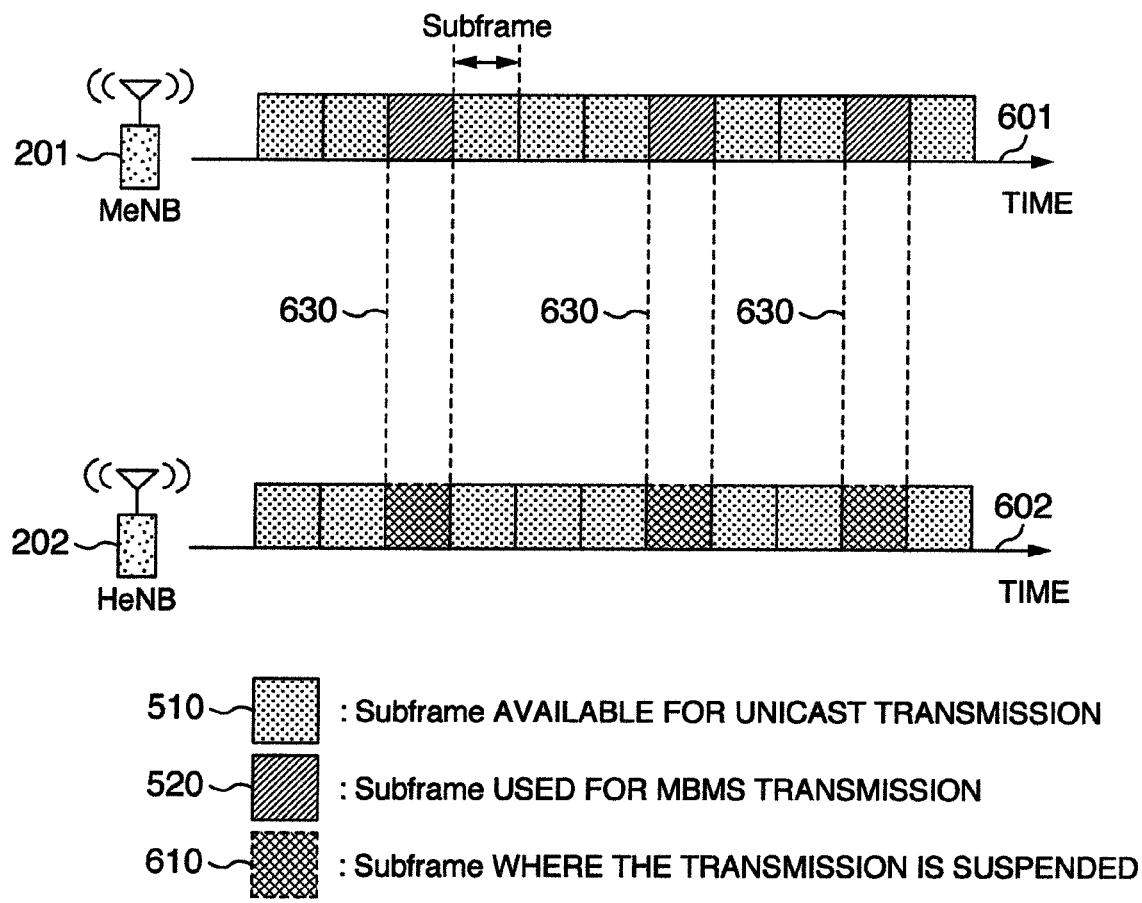
FIG. 6 is a time chart showing transmission timing of the MeNB and the HeNB in consideration of the MBMS transmission timing.

Timing when the transmission is suspended in the HeNB 202 will now be described with reference to FIGS. 5 and 6. In FIGS. 5 and 6, it is assumed that the scheduling is executed on a unit basis of a time slot called a subframe.

FIG. 5 is a diagram showing unicast transmission timing 510 and MBMS transmission timing 520 in the MeNB 201 and the HeNB 202 in the case where the HeNB 202 executes the unicast transmission irrespective of the MBMS transmission timing. Transmission timing for a plurality of subframes of the MeNB 201 which are allocated along a time base 501 is shown. Transmission timing for a plurality of subframes of the HeNB 202 which are allocated along a time base 502 is shown.

The MeNB 201 performs the MBMS transmission in a subframe 530 indicated by the MCE 205 and other subframes are available for the unicast data transmission. The HeNB 202 can use an arbitrary subframe for the unicast transmission irrespective of whether or not the MeNB 201 is executing the MBMS transmission. Therefore, even at the MBMS transmission timing 520, when the HeNB 202 performs the unicast data transmission, the HUE 210 serving as a destination of the data receives the unicast data. Even if the HUE 210 which is not the destination of the data tries to receive the MBMS data which is transmitted from the adjacent MeNB 201, the unicast data transmission of the HeNB 202 interferes. Therefore, reception quality of the MBMS data deteriorates largely and there is a risk that the data decoding becomes impossible.

FIG. 6 is a diagram showing the unicast transmission timing 510, the MBMS transmission timing 520, and timing 610 when the transmission is suspended in the MeNB 201 and the HeNB 202 in the case where the MBMS transmission timing is considered. Transmission timing for a plurality of subframes of the MeNB 201 which are allocated along a time base 601 are shown. Transmission timing for a plurality of subframes of the HeNB 202 which are allocated along a time base 602 are shown. In a manner similar to FIG. 5, the MeNB 201 performs the MBMS transmission in the subframe indicated by the MCE 205 and other subframes are available for the unicast data transmission. The HeNB suspends a transmission of a downlink in a subframe 630 in which the MeNB 201 performs the MBMS transmission.

Thus, in the subframe in which the MBMS transmission is executed, the HUE 210 does not need to receive the unicast data. Further, if the HUE tries to receive the MBMS data which is transmitted from the adjacent MeNB, the interference due to the unicast data transmission of the HeNB does not occur. Therefore, the reception quality of the MBMS data is improved as compared with the case of FIG. 5.

In FIG. 6, it is assumed that the subframe synchronization is obtained between the MeNB 201 and the HeNB 202. Such a subframe synchronization can be realized by making time synchronization by a GPS (Global Positioning System) or the like.

As shown in FIG. 6, since the HeNB suspends the transmission in the MBMS transmission subframe, the HeNB 202 does not perform the scheduling of the unicast data transmission to the MBMS transmission subframe.

Subsequently, the MCH subframe information table 321 stored in the memory 301 in FIG. 3 will be described with reference to FIG. 14. The MCH subframe information table 321 in FIG. 14 is constructed by: a type of subframe; a type of parameter in the subframe; and a value of the parameter. FIG. 14 shows an example in the case where the number of MCHs is equal to 2 in an MBSFN area which is comprised of one or multiple MeNBs which perform the MBMS transmission.

MCH common control information 1 is subframe allocation information to the MBSFN area. The MCH common control information 1 shows that a parameter 1401 includes a value of an allocation period of a radio frame, a parameter 1402 includes a value of a time offset of the radio frame, and a parameter 1403 includes a subframe allocation bitmap in the radio frame. MCH common control information 2 is different subframe allocation information to the MBSFN area. The MCH common control information 2 includes a parameter 1404 showing an interleave period (Common Allocation Period) between the MCHs corresponding to the MCH common control information 1 and 2. MCH dedicated information is subframe allocation information (MSAP: MCH Subframe Allocation Pattern) of each MCH. A parameter 1405 is a final subframe number of each MCH in the Common Allocation Period. A parameter 1406 is a time period of the MSAP of each MCH in the Common Allocation Period.

The MCH subframe information table shown in FIG. 14 has been stored in the memory 401 of the MCE 205 as an MCH subframe information table 421. In the HeNB 202, the information of FIG. 14 which is notified through an interface A serving as a wired network has been stored in the memory 301 as an MCH subframe information table 321.

Figure 7:
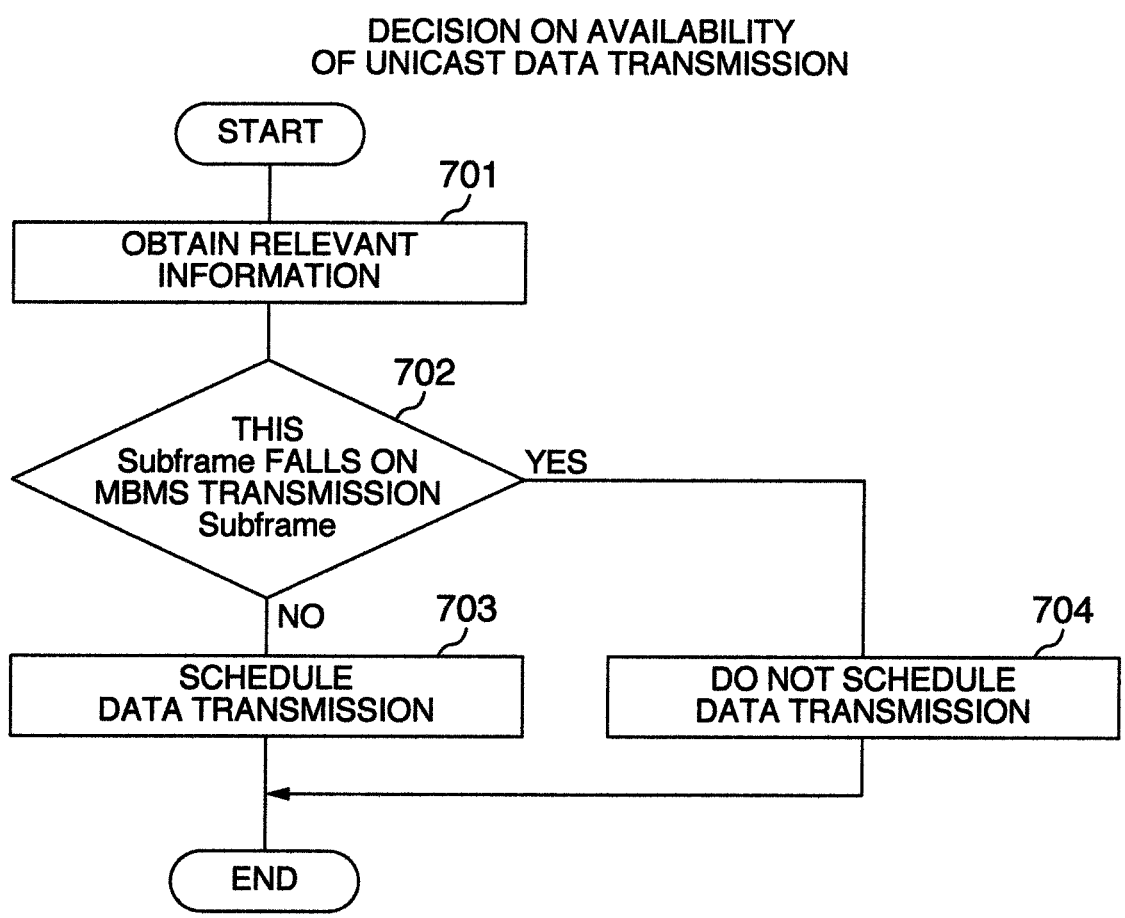
FIG. 7 is a flowchart showing a unicast data transmission availability decision process for determinating whether or not the HeNB executes a unicast data transmission.

FIG. 7 is a flowchart showing an example of a procedure (unicast data transmission availability decision process) for allowing the HeNB 202 to decide the availability of the scheduling of the unicast data transmission in each subframe. The process of FIG. 7 has been stored in the memory 301 as a program 312 for decision on availability of the unicast data transmission. The CPU 302 reads out the program 312 for decision on availability of the unicast data transmission and executes it. In FIG. 7, first, the HeNB 202 obtains the information such as MBMS transmission timing or the like with reference to the MCH subframe information table 321 or the MBSFN subframe information table 322 stored in the memory 301 (701). Subsequently, the HeNB 202 determines whether or not the relevant subframe is the MBMS transmission subframe from the information collected in step 701 (702). If the relevant subframe is not the MBMS transmission subframe, the HeNB 202 can perform the scheduling of the unicast data transmission (703). Specifically speaking, the HeNB 202 allocates the subframe, as a subframe for the unicast transmission, which is not the subframe that is used for the MBMS transmission.

If the relevant subframe is the MBMS transmission subframe, the HeNB 202 does not perform the scheduling of the unicast data transmission (704). The processing routine is returned to step 702 and the HeNB 202 also determines the availability of the scheduling of the unicast data transmission with respect to other subframes and sequentially performs the scheduling.

Figure 8:
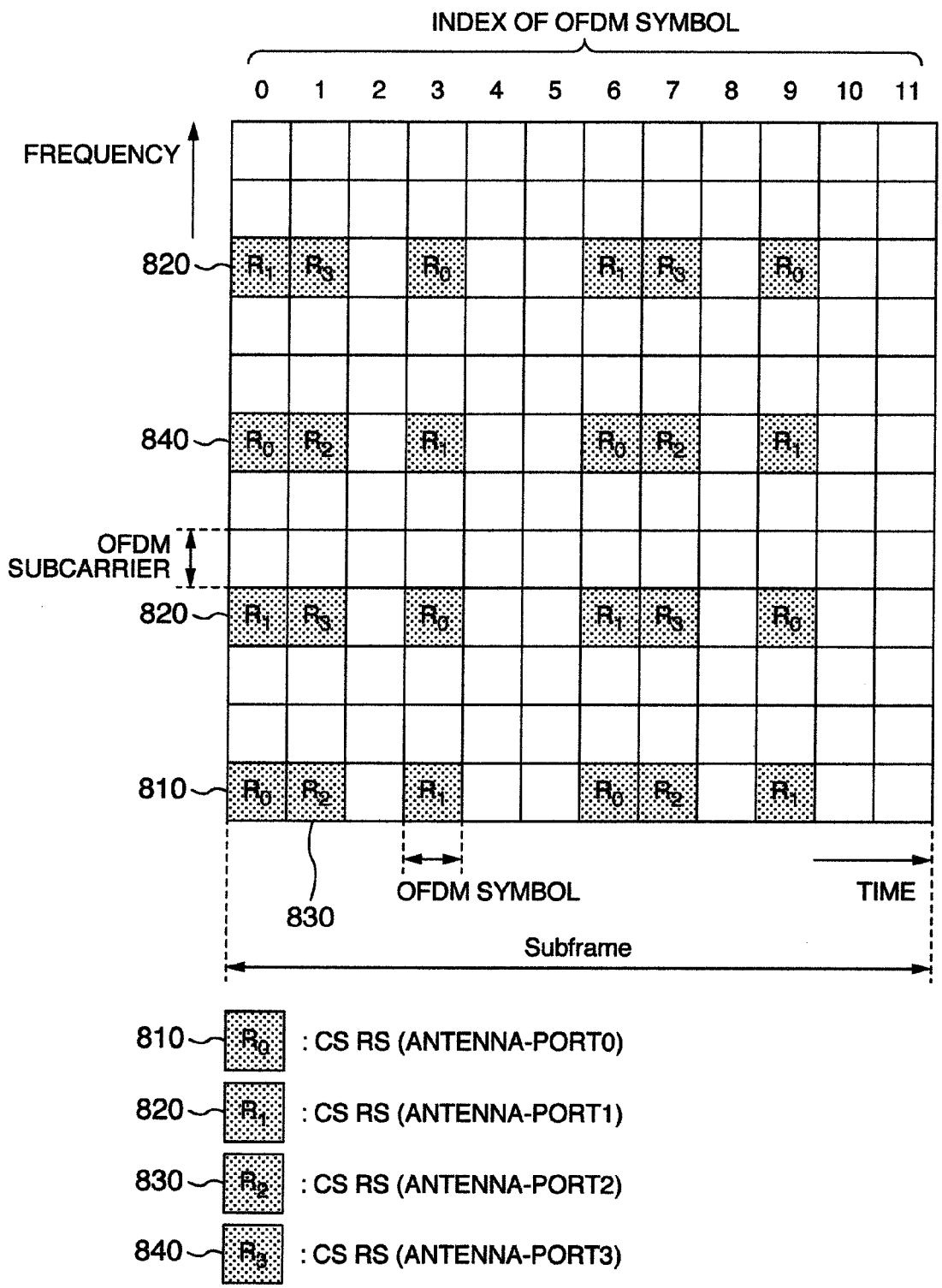
FIG. 8 is a diagram showing a layout of reference signals for the unicast transmission.
Figure 9:
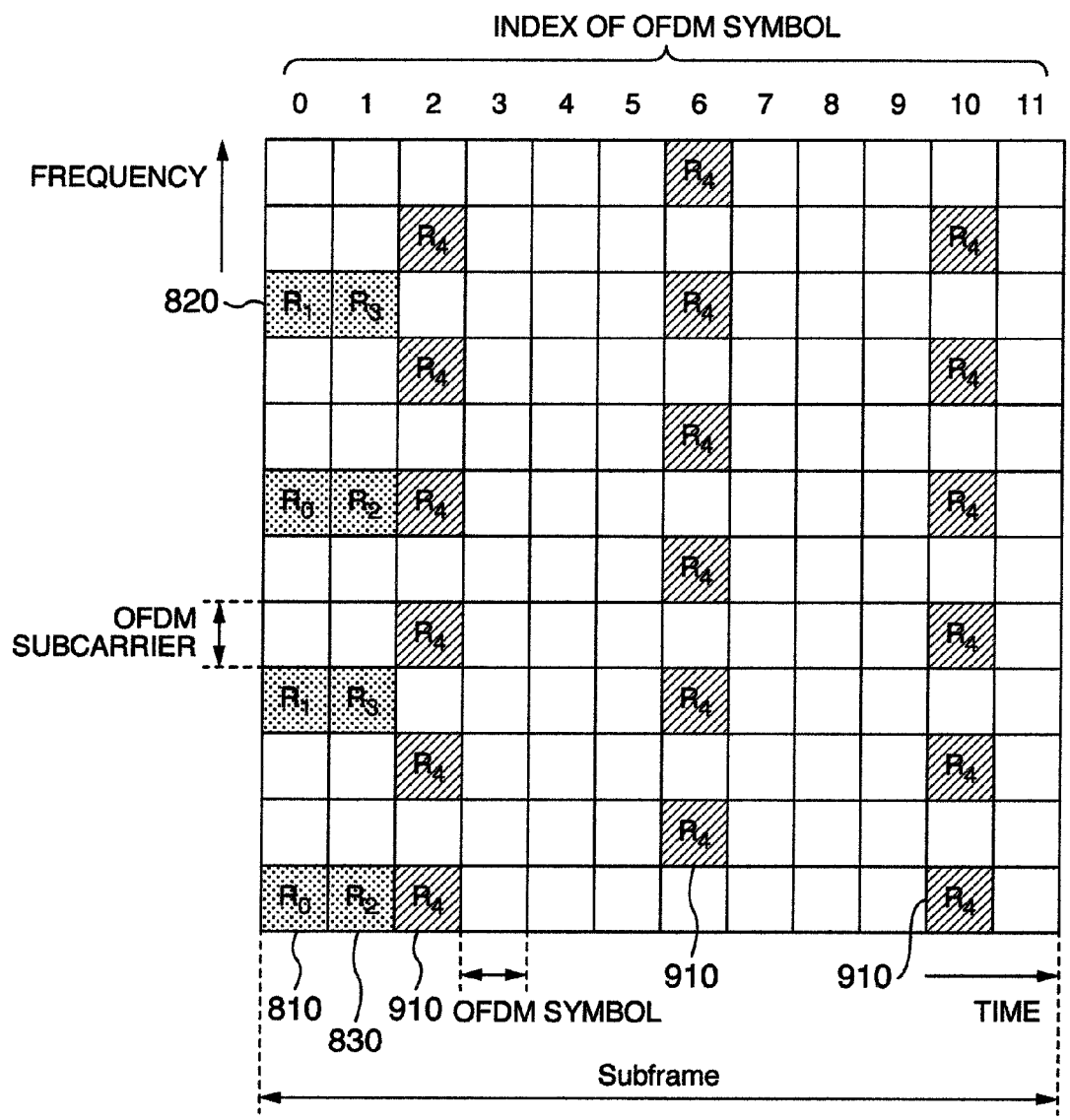
FIG. 9 is a diagram showing a layout of reference signals of the MeNB of an MBMS transmission subframe.
Figure 10:
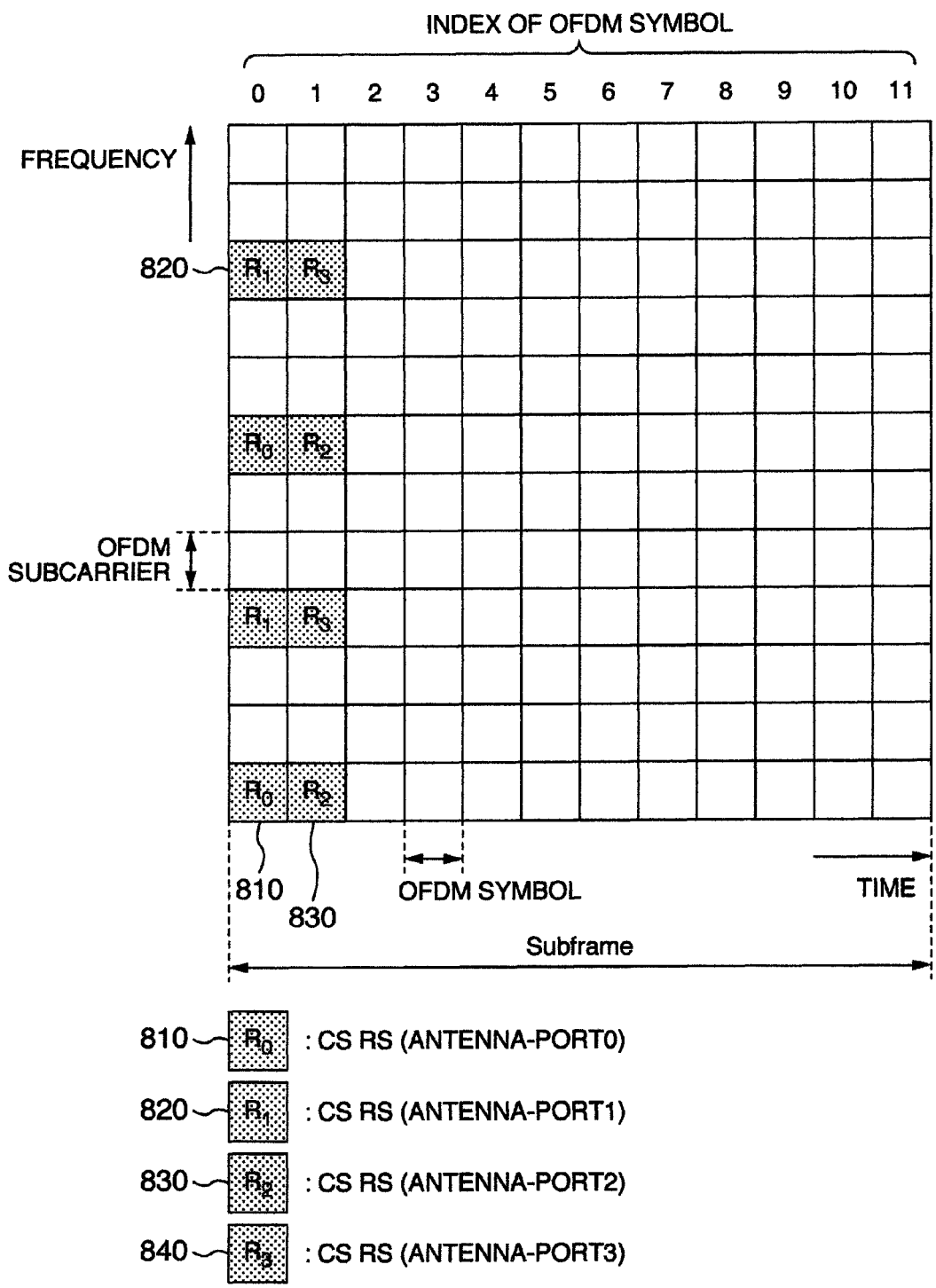
FIG. 10 is a diagram showing a layout of reference signals of the HeNB of the MBMS transmission subframe in the invention.

As already described in FIG. 6, in the MBMS transmission subframe, in the unicast data transmission availability decision process of FIG. 7, the HeNB 202 does not transmit the unicast data and may suspend the transmission so that the MBMS data is not interfered. This implies that it is not always necessary that the HeNB 202 suspends the transmission of all physical channels. What physical channels the HeNB should suspend the transmission of will be described with reference to FIGS. 8, 9, and 10 with respect to a reference signal (RS) which is used for a demodulation or the like of a radio signal by the terminal as an example. FIGS. 8, 9, and 10 show layout examples of frequency/time regions of RS symbols in a resource block (RB) comprised of a plurality of OFDM subcarriers which are continuous in a frequency domain and a plurality of OFDM symbols which are continuous in a time domain.

It is assumed hereinbelow that a time length of the RB is equal to one subframe. In FIGS. 8, 9, and 10, the following signals are presumed as RSs: that is, cell-specific reference signals (CS RSs) 810, 820, 830, and 840 which are used for a demodulation of the unicast data, cell-specific warning information, and cell-specific physical-layer control information, a measurement of radio signal quality, and the like; and an MBSFN reference signal (MBSFN RS: MBMS SFN reference signal) which is used for a demodulation of the MBMS data. In FIGS. 8, 9, and 10, it is assumed that the number of antenna-ports equipped for the MeNB or the HeNB is equal to 4.

FIG. 8 is the layout example of the frequency/time regions of the CS RS of the MeNB or the HeNB in the subframe that is available for the unicast transmission in FIG. 5. In FIG. 8, in the OFDM symbol indices 0, 1, 3, 6, 7, and 9, the CS RSs 810, 820, 830, and 840 have been inserted. As shown in the diagram, the CS RSs have also been inserted with respect to the symbols other than the OFDM symbols added with the reference numerals.

FIG. 9 is the layout example of the frequency/time regions of the CS RS and the MBSFN RS of the MeNB 201 in the subframe that is used for the MBMS transmission in FIG. 5. In the example of FIG. 9, MBMS data 910 is inserted into the OFDM symbols with OFDM symbol index 2 and after the OFDM symbol index 2. Therefore, the MBSFN RS has been inserted in the OFDM symbols with OFDM symbol index 2 and after the OFDM symbol index 2. In the OFDM symbol indices 0 and 1, since the cell-specific physical-layer control information is inserted, the CS RSs 810, 830, and the like are inserted. That is, a range of the symbols in which the MBMS data is inserted and a range of the symbols in which the cell-specific physical-layer control information such as CS RS or the like or the information for making the unicast communication is inserted are separately provided.

FIG. 10 is the layout example of the frequency/time regions of the CS RS of the HeNB in the subframe 630 where the transmission is suspended as in FIG. 6. In the example of FIG. 10, in the OFDM symbol indices 0 and 1 in which the cell-specific physical-layer control information can be inserted, the CS RSs 810, 820, and 830 are inserted. In the OFDM symbols with OFDM symbol index 2 and after the OFDM symbol index 2 in which the MeNB 201 transmits the MBMS data, in order to prevent the interference, no RSs are inserted. That is, the RS is not inserted in the symbols in which the MBMS data is inserted for the MeNB, and the CS RSs are inserted in the region in which the MBMS data is not inserted. Since the HeNB 202 does not transmit the MBMS data, there is no need to insert the MBSFN RS for HeNB 202. The layout of the CS RSs in FIG. 10 is used in the subframe which the HeNB has determined in step 704 in FIG. 7 that the scheduling of the data transmission is not performed because the relevant subframe corresponds to the MBMS transmission subframe.

It is now assumed that at the time of the MBMS transmission, a channel MCH (Multicast Channel) including one or a plurality of MBMS service data and control information is constructed. It is assumed hereinbelow that one MAC (Media Access Control) packet is transmitted in one subframe for MBMS purpose and data of one MCH is included in one MAC packet.

Figure 11:
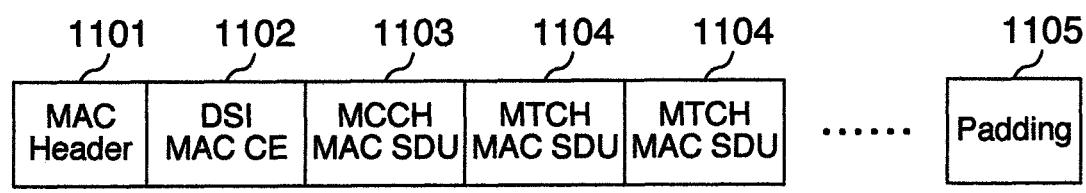
FIG. 11 is a diagram showing a construction of an MAC PDU.

FIG. 11 shows a constructional example of an MBMS MAC packet. The MBMS MAC packet (PDU: Protocol Data Unit) includes an MAC header 1101, an MCCH (Multicast Control Channel) SDU (Service Data Unit) 1103, an MTCH (Multicast Traffic Channel) SDU 1104, and a DSI (Dynamic Scheduling Information) MAC CE (Control Element) 1102. The MAC packet does not always include all of the foregoing elements. The MCCH SDU 1103 includes data of the MBMS control channel such as MBMS service information and transmission subframe information of the MCH. The MTCH SDU 1104 includes data of the MBMS traffic channel, that is, the MBMS service data. The DSI MAC CE 1102 includes scheduling information of the MTCH in the MCH.

First, the UE (for example, HUE 210 or MUE 209) which receives the MBMS receives the MCH in the subframe in which the MCCH SDU 1103 is transmitted and obtains the transmission subframe information of the MCH from the MCCH SDU 1103. Subsequently, the UE receives the MCH by using the MCH transmission subframe information. The subframe information to which the SDU 1104 of each MTCH is transmitted is included in the DSI MAC CE 1102 included in the MCH data. The UE obtains the MTCH SDU 1104 corresponding to a desired service with reference to the subframe information.

According to the foregoing embodiment, the HUE 210 does not need to receive the unicast data in the subframe in which the MBMS transmission is executed. According to the foregoing embodiment, in the case where the HUE tries to receive the MBMS data which is transmitted from the adjacent MeNB, since the interference due to the unicast data transmission of the HeNB does not occur, reception quality of the MBMS data is improved.

[Embodiment 1]

The first embodiment to which the embodiment of the invention is applied will be described with reference to FIGS. 12, 13, 14, 15, and 16. In the first embodiment, the MCE 205 notifies the HeNB 202 of time slot (subframe) information in which the MeNB 201 performs the MBMS transmission. The HeNB 202 suspends the transmission in accordance with the MBMS transmission subframe information notified by the MCE 205.

Figure 12:
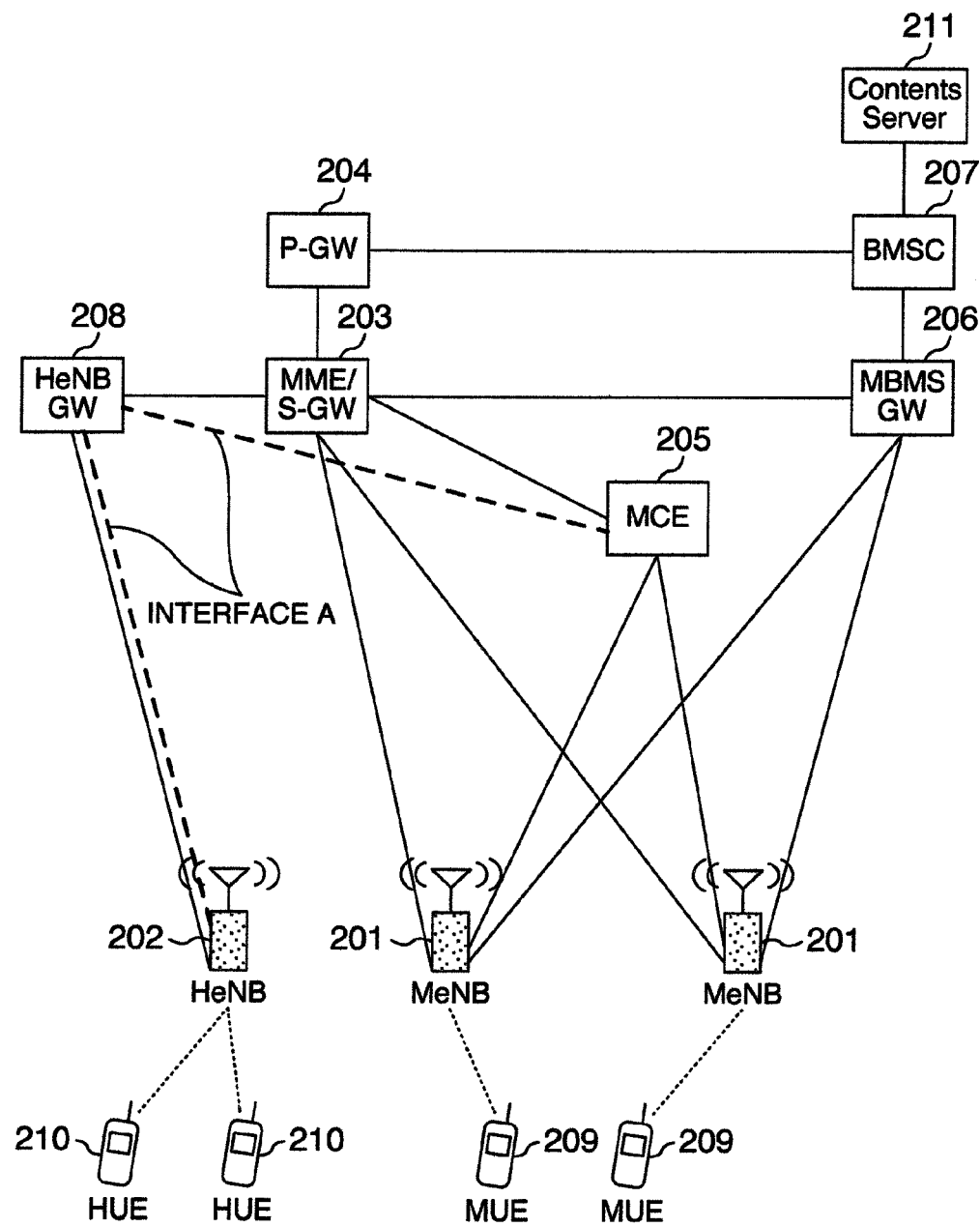
FIG. 12 is a diagram showing a logical architecture of a network including an interface from the MCE to the HeNB.

FIG. 12 is a constructional example of a logical architecture of the network to realize the notification of the MBMS transmission subframe information from the MCE to the HeNB. In FIG. 12, the interface A for transferring the information from the MCE 205 to the HeNB through the wired network and the HeNB GW 208.

FIG. 13 is a flowchart showing a procedure (MBMS transmission subframe information notification decision process) for deciding whether or not the MBMS subframe information is notified to the HeNB in the MCE 205. The process of FIG. 13 has been stored in the memory 401 in FIG. 4 as a program 411 for decision on informing the MBMS transmission subframe information and is executed by the CPU 402 in FIG. 4. The MCE 205 performs the scheduling of the MBMS transmission by the CPU 402 and holds the formed MBMS transmission subframe information into the memory 401.

First, the MCE 205 decides whether or not the MBMS scheduling is performed in accordance with a situation or the like of the MBMS services (1301). In the example of FIG. 13, when the MBMS scheduling is not performed, the MBMS subframe information is not notified from the MCE 205 to the HeNB 202. If it is determined that the MBMS scheduling is performed, the MCE 205 performs the MBMS scheduling (1302) and stores a result of the scheduling into the memory 401. Subsequently, the MCE 205 determines whether or not the MBMS subframe information has been updated (1303). In the example of FIG. 13, if the MBMS subframe information is not updated, the MBMS subframe information is not notified from the MCE 205 to the HeNB 202. If the MBMS subframe information has been updated, the MCE 205 extracts the MBMS subframe information from the memory 401 and notifies the HeNB of the MBMS subframe information through the interface A (1304).

An example of the MBMS subframe information which is stored in the memory 401 is the foregoing MBMS subframe information table shown in FIG. 14.

In the example of FIG. 13, whether or not the MBMS subframe information is notified from the MCE 205 to the HeNB 202 is determined in dependence on whether or not the MBMS scheduling is performed and whether or not the MBMS subframe information has been updated. However, it may be determined only by one of those two decision references or the MBMS subframe information may be notified from the MCE 205 to the HeNB 202 at a predetermined time period. Or, the MBMS subframe information may be notified from the MCE 205 to the HeNB 202 in response to a request from the HeNB 202.

The HeNB 202 which received the MBMS subframe information stores it into the memory 301 and obtains the MBMS subframe information from the memory in step 701 in FIG. 7 as mentioned above.

Figure 15:
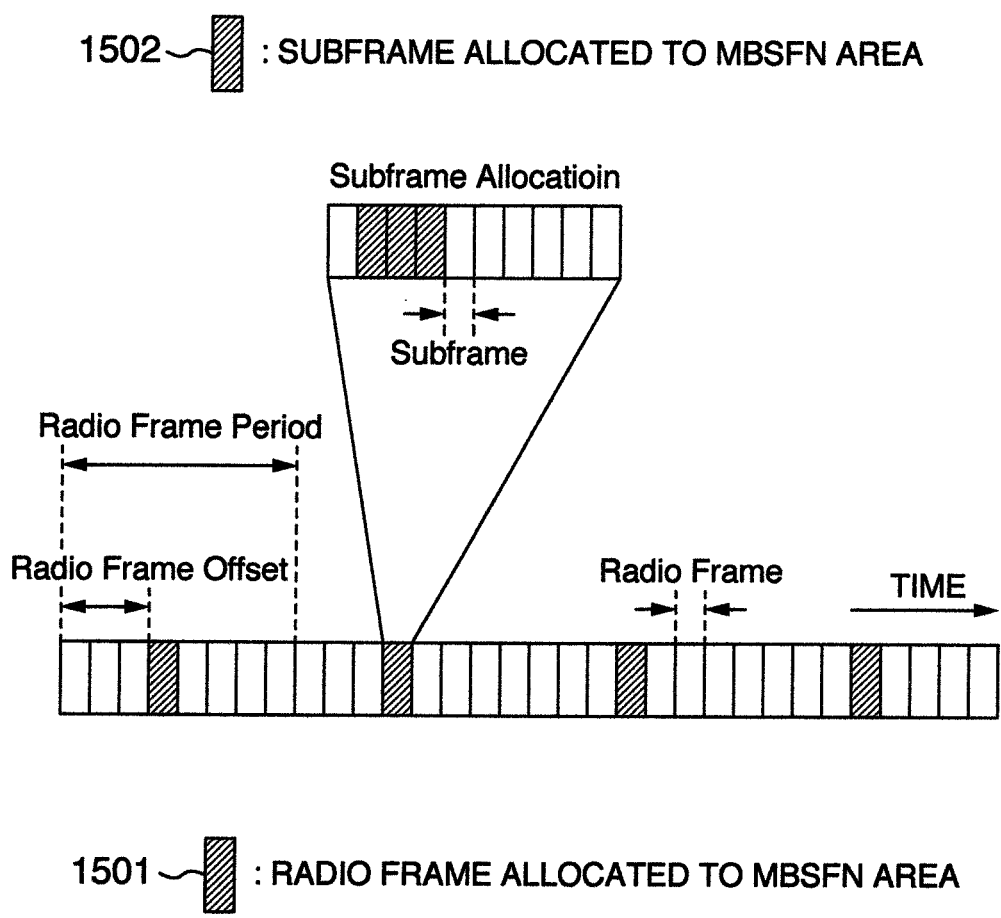
FIG. 15 is a diagram showing an allocation of the MBMS transmission subframe.

In step 1304, it is not always necessary that the MCE 205 notifies the HeNB 202 of all information in the MCH subframe information table 321 shown in FIG. 14. For example, a case where only the MCH common information 1 in the MCH subframe information table of FIG. 14 has been notified will be described with reference to FIG. 15. FIG. 15 shows an example of an MBMS transmission suspending radio frame and the subframe in the HeNB 202 in the case where only the MCH common information 1 has been notified as MBMS subframe information from the MCE 205 to the HeNB 202. The subframe information which is notified by the MCH common information 1 includes all of the subframes allocated to the MBSFN area. Therefore, the HeNB 202 can know a radio frame 1501 allocated to the MBSFN area and a subframe 1502 allocated to the MBSFN area in this radio frame as shown in FIG. 15. In step 702 in FIG. 7, it is sufficient that the HeNB 202 suspends the transmission in the subframe as shown in FIG. 15 with reference to the subframe information.

Figure 16:
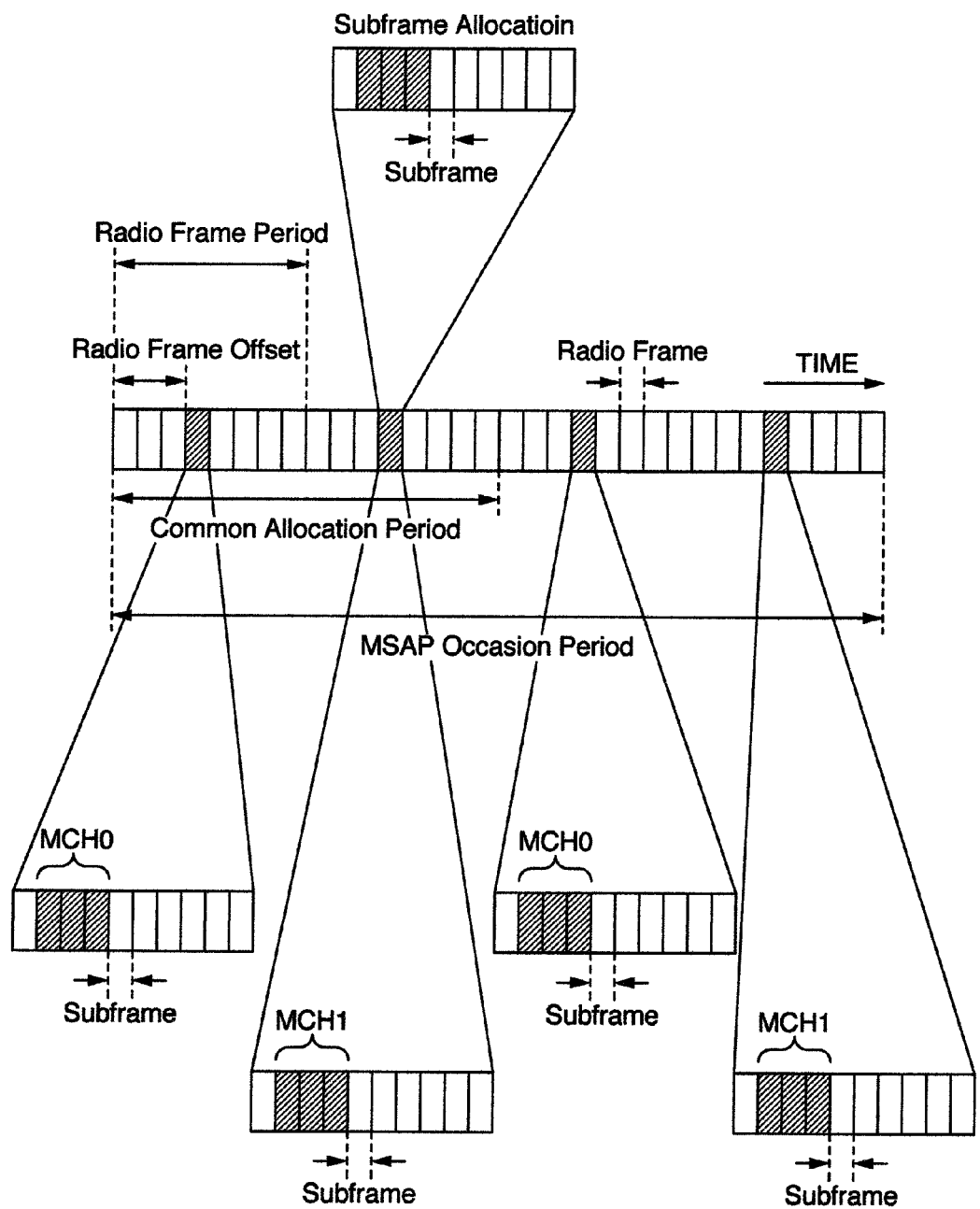
FIG. 16 is a diagram showing an allocation of the transmission subframe to each MCH.

A case of notifying the HeNB of all of the information in the MCH subframe information table of FIG. 14 in step 1304 will be described with reference to FIG. 16. FIG. 16 shows an example of the MBMS transmission suspending radio frame and the subframe in the HeNB in the case where all of the information in the MCH subframe information table shown in FIG. 14 has been notified as MBMS subframe information from the MCE to the HeNB. In the case of notifying the HeNB of all of the information in the MCH subframe information table shown in FIG. 14 from the MCE as mentioned above, in addition to the information of the subframe allocated to the MBSFN area as shown in FIG. 15, the HeNB 202 can know the information of the subframe which is used for each MCH transmission in the subframe allocated to the MBSFN area, i.e. MSAP, as shown in FIG. 16. In this case, the HeNB 202 can select every MCH whether or not the transmission is suspended every MCH in step 702. Owing to the embodiment, the HeNB 202 can obtain the information of the subframe in which t the transmission should be suspended.

[Embodiment 2]

The second embodiment to which the embodiment of the invention is applied will be described with reference to FIGS. 17, 18, and 19. In the second embodiment, the MeNB 101 notifies the HeNB 104 of the time slot (subframe) information in which the MeNB performs the MBMS transmission. The HeNB 104 suspends the transmission in accordance with the MBMS transmission subframe information notified to the MeNB 101.

Figure 17:
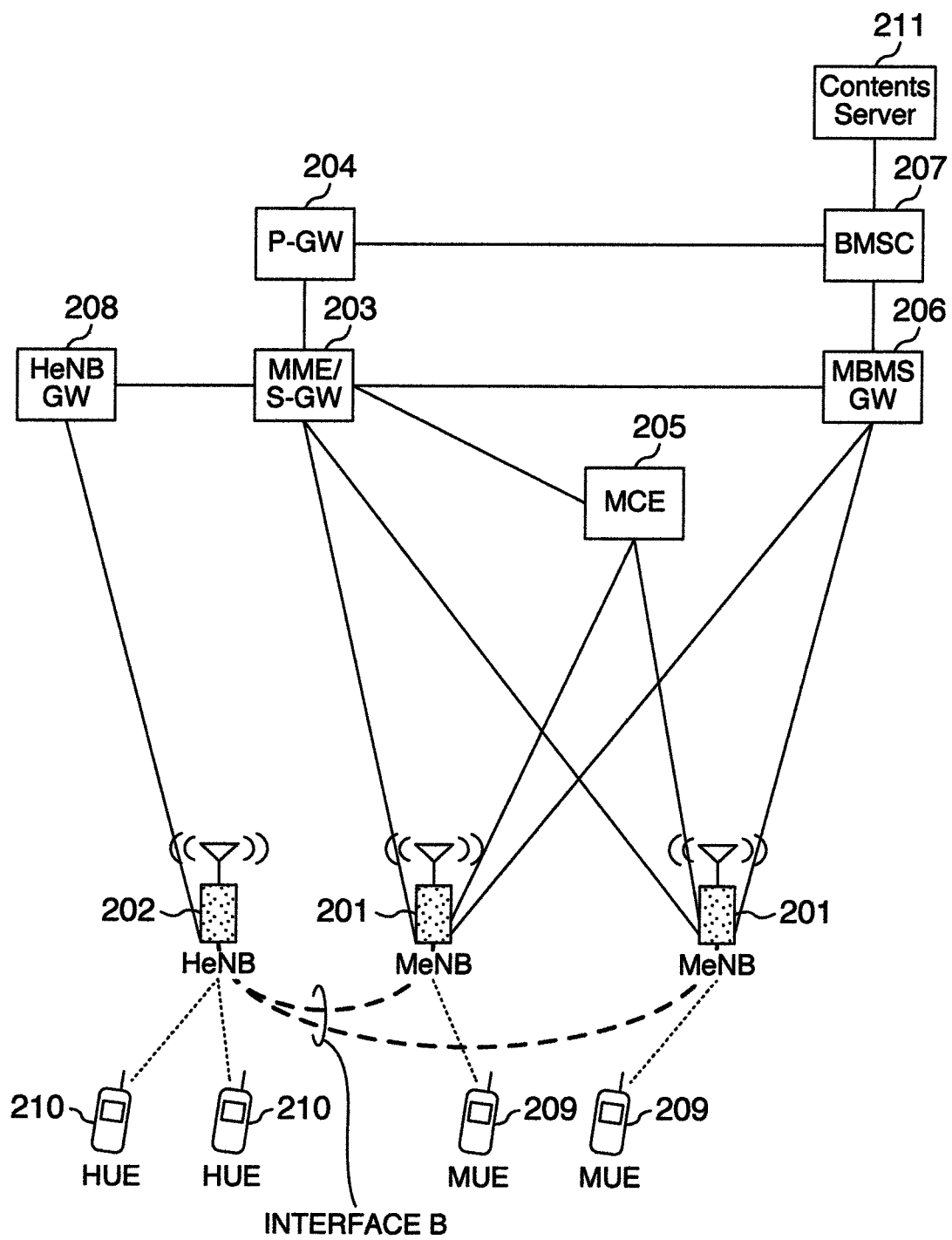
FIG. 17 is a diagram showing a logical architecture of a network including an interface from the MeNB to the HeNB.

FIG. 17 is a constructional example of a logical architecture of the network to realize the MBMS transmission subframe information notification from the MeNB 101 to the HeNB 104 in the second embodiment. In FIG. 17, an interface B for transferring the information from the MeNB 101 to the HeNB 104 through the radio network is provided. The interface B may be realized by providing the wired link or radio link between the MeNB and the HeNB or may be realized through a network apparatus such as MME/S-GW or HeNB GW. The constructional diagram of the HeNB 202 in FIG. 3 shows an example in which the interface B is realized by providing the radio link between the HeNB 202 and the MeNB 201. For example, the HeNB 104 belonging to the macrocell 106 of the MeNB 101 as shown in FIG. 1 obtains the MBMS transmission subframe information from the MeNB 101.

A specific realizing method in the case of realizing the interface B by the radio link between the MeNB and the HeNB will be described hereinbelow.

An eNB serving as a base station transmits cell-specific broadcast information SIB (System Information Block). Particularly, the MeNB 201 notifies the terminal 102, 209, or 210 of the MBSFN subframe information as MBMS transmission timing information by the SIB. The MBSFN subframe information is cell-specific information which is formed by the MeNB 201 on the basis of the MBMS scheduling information or the like which is notified from the MCE to the MeNB. The MBSFN subframe may be used not only for the MBMS transmission but also for another object such as an RS transmission for measuring the position or the like. FIG. 18 shows the MBSFN subframe information (MBSFN subframe information table) which is notified by the MeNB 201 by the SIB. The information of FIG. 18 has been stored in the memory 301 of the HeNB as an MBSFN subframe information table 422. In the HUE, the information of FIG. 18 which is notified through the interface B has been stored in the memory 2901 as an MBSFN subframe information table 2921. A parameter 1801 denotes an allocation period of the radio frame. A parameter 1802 denotes a time offset of the radio frame. A parameter 1803 denotes a subframe allocation bitmap in the radio frame.

In the embodiment, in the HeNB 202, the receiving function in the downlink is included in the interface 303 and, through the interface 303, the HeNB 202 receives the SIB which is transmitted by the MeNB 201. Thus, the MBSFN subframe information table as shown in FIG. 18 can be notified from the MeNB 201 to the HeNB 202.

FIG. 19 shows an example of the MBMS transmission suspending radio frame and the subframe in the HeNB 202 in the case where only the MBSFN subframe information table of FIG. 18 has been notified as MBMS subframe information from the MeNB 201 to the HeNB 202. The HeNB 202 can know a radio frame 1901 including the MBSFN subframe and a subframe 1902 allocated as an MBSFN subframe in the radio frame as shown in FIG. 19. It is sufficient that the HeNB suspends the transmission in the subframe 1902 as shown in FIG. 19.

The MBSFN subframe information is cell-specific information as already described and there is a case where it differs between the MeNBs 201. In the case where the HeNB receives the MBSFN subframe information about a plurality of MeNBs and the MBSFN subframe information differs between the MeNBs, the HeNB 202 may synthesize a plurality of MBSFN subframe information and use the synthesized information. For example, it is sufficient that the HeNB 202 refers to the MBSFN subframe in step 702 in FIG. 7 and suspends the transmission in the subframe corresponding to the MBSFN subframe with respect to at least one MeNB. Owing to the embodiment, the HeNB can obtain the information of the subframe in which the transmission should be suspended.

[Embodiment 3]

The third embodiment to which the embodiment of the invention is applied will now be described with reference to FIGS. 20, 21, 22, and 23. In the third embodiment, the HeNB 202 notifies the HUE 210 of the information for allowing the HUE 210 to perform the MBMS reception.

In the following description, it is assumed that the UE which performs the MBMS reception first obtains the MCCH SDU in the MCH as mentioned above. Therefore, in the embodiment, the information for the MBMS reception which is notified to the HUE 210 by the HeNB 202 is the information regarding the MCCH transmission. The information regarding the MCCH transmission has been held in the memory 301 of the HeNB 202 and is notified to the HUE 210 from the radio I/F 303 in accordance with a judgment of the HeNB.

FIG. 20 is an example of the MCCH transmission information table which is notified to the HUE 210 from the HeNB 202. The table of FIG. 20 includes the MCCH transmission information such as transmission timing of the MCCH and the like. A parameter 2001 denotes an MBSFN area ID and indicates a group of the MeNBs which synchronously perform the MBMS transmission. A parameter 2002 denotes an ID of MCCH updates information (Notification). A parameter 2003 denotes a repetitive transmission period of the MCCH. A parameter 2004 denotes an offset of the transmission timing of the MCCH. A parameter 2005 denotes an updating period of the MCCH. A parameter 2006 denotes a subframe in which the MCCH is transmitted in the radio frame that is indicated by the parameters 2003 and 2004. A parameter 2007 denotes an MCS (Modification and Coding Scheme) which is used for a modulation of the MCCH. The information of FIG. 20 has been stored in the memory 301 of the HeNB as an MCCH transmission information table 323. In the HUE, the information of FIG. 20 which is notified from the HeNB has been stored in the memory 2901 as an MCCH transmission information table 2922. By obtaining the MCCH transmission information table of FIG. 20, the HUE 210 can know the transmission subframe of the MCH in which the MCCH is included and the MCS. The HUE 210 can obtain the MCCH SDU.

FIG. 21 is an example of the transmission information (Notification transmission information table) of the MCCH updates information which is notified from the HeNB 202 to the HUE 210. The Notification transmission information table of FIG. 21 includes the transmission information of the MCCH updates information (Notification). The Notification is transmitted from the eNB in order to notify the UE of the presence or absence of the updating of the contents of the MCCH. In FIG. 21, a parameter 2101 denotes the number of repetitive transmission times of the Notification. A parameter 2102 denotes an offset of the transmission timing of the Notification. A parameter 2103 denotes a subframe in which the Notification can be transmitted in the radio frame that is indicated by the parameters 2101 and 2102. The information of FIG. 21 has been stored in the memory 301 of the HeNB as a Notification transmission information table 324. In the HUE, the information of FIG. 21 which is notified from the HeNB has been stored in the memory 2901 as a Notification transmission information table 2923.

FIG. 22 is an example of the MCCH updates information (Notification) (Notification area information table) which is notified from the HeNB 202 to the HUE 210. The Notification area information table of FIG. 22 includes the MCCH updates information. A parameter 2201 denotes an MBSFN area in which the MCCH has been updated. A correspondence relation between the parameter 2201 and the MBSFN area ID is indicated with the parameter 2002 in the MCCH transmission information table of FIG. 20. The information of FIG. 22 has been stored in the memory 301 of the HeNB as a Notification area information table 325. In the HUE, the information of FIG. 22 which is notified from the HeNB has been stored in the memory 2901 as a Notification area information table 2924.

The HUE 210 can know the transmission timing of the Notification by obtaining the notification transmission information table of FIG. 21 and can obtain the Notification area information table of FIG. 22. Further, the HUE can obtain the MCCH SDU on the basis of the presence or absence of the updating of the MCCH by obtaining the Notification area information table of FIG. 22.

The information which is notified to the HUE 210 by the HeNB 202 as described above constructs the logical architecture as shown in FIG. 12. It is sufficient that the HeNB 202 obtains it from the MCE 205. The information which is notified to the MCE from the HeNB may be, for example, the format of the table shown in FIG. 20, 21, or 22. Or, the HeNB may form the table shown in FIG. 20, 21, or 22 on the basis of the table of FIG. 14 obtained from the MCE or the table of FIG. 18 obtained from the MeNB.

Figure 23:
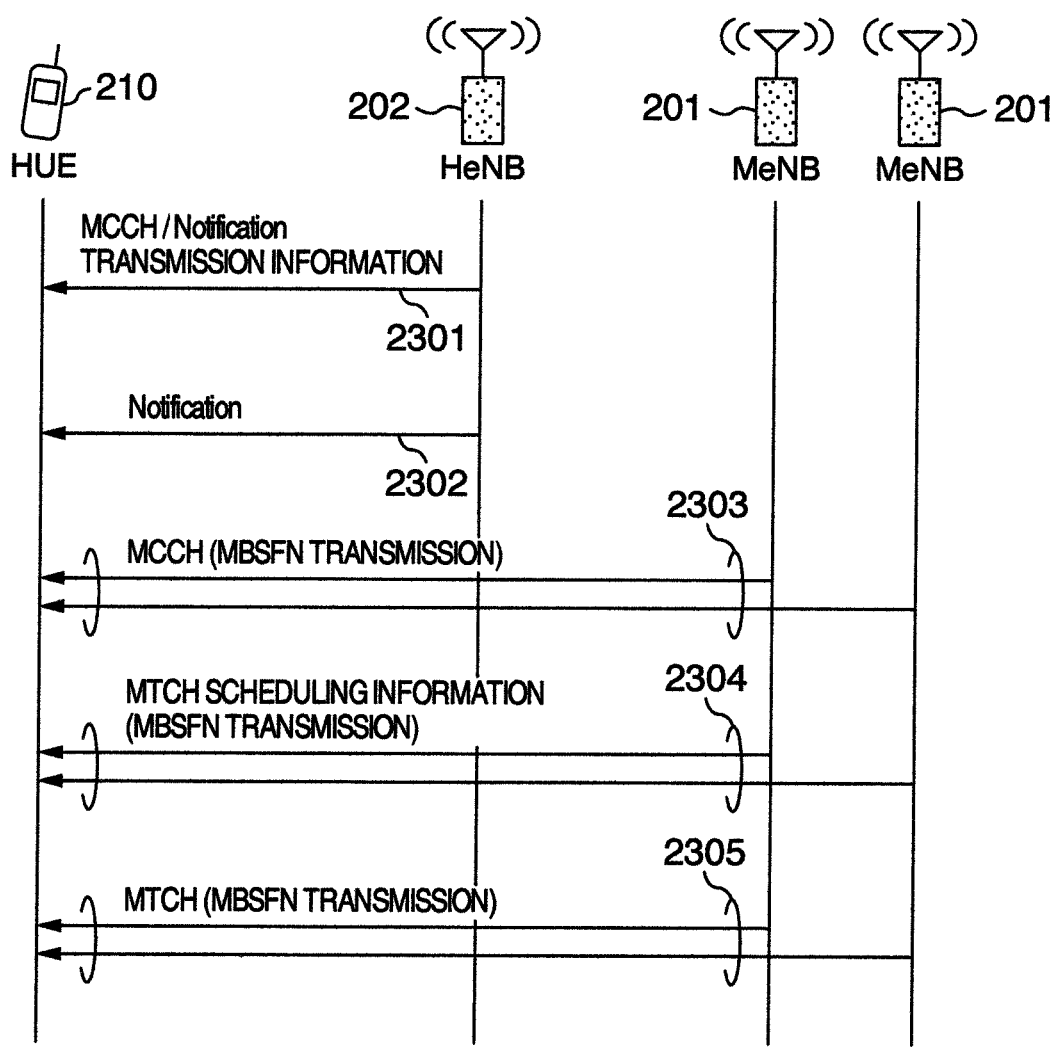
FIG. 23 is a sequence diagram showing a procedure for allowing the HUE to receive MBMS services.

FIG. 23 is a sequence diagram showing an example of a procedure for allowing the HUE 210 to obtain the MCCH transmission information and perform the MBMS reception. In FIG. 23, first, in a sequence 2301, the HUE 210 obtains the MCCH transmission information which is transmitted by the HeNB 202 in the format shown in FIG. 20 and the Notification transmission information which is transmitted by the HeNB 202 in the format shown in FIG. 21. Subsequently, in a sequence 2302, the HUE 210 obtains the Notification with reference to the transmission timing of the Notification included in the Notification transmission information notified in the format shown in FIG. 21. If a fact that the MCCH has been updated is shown in the Notification received in the sequence 2302, in a sequence 2303, the HUE 210 obtains the MCCH SDU which is transmitted from the surrounding MeNB(s) 201 in accordance with the MCCH transmission information notified in the format in FIG. 20. Further, the HUE 210 obtains the DSI in a sequence 2304. The HUE obtains the correspondence relation between the desired MBMS service to be obtained from the MCCH and the MTCH and obtains the scheduling information of the MTCH from the DSI. In a sequence 2305, the HUE 210 obtains the MTCH SDU corresponding to a desired MBMS service on the basis of them.

Figure 24:
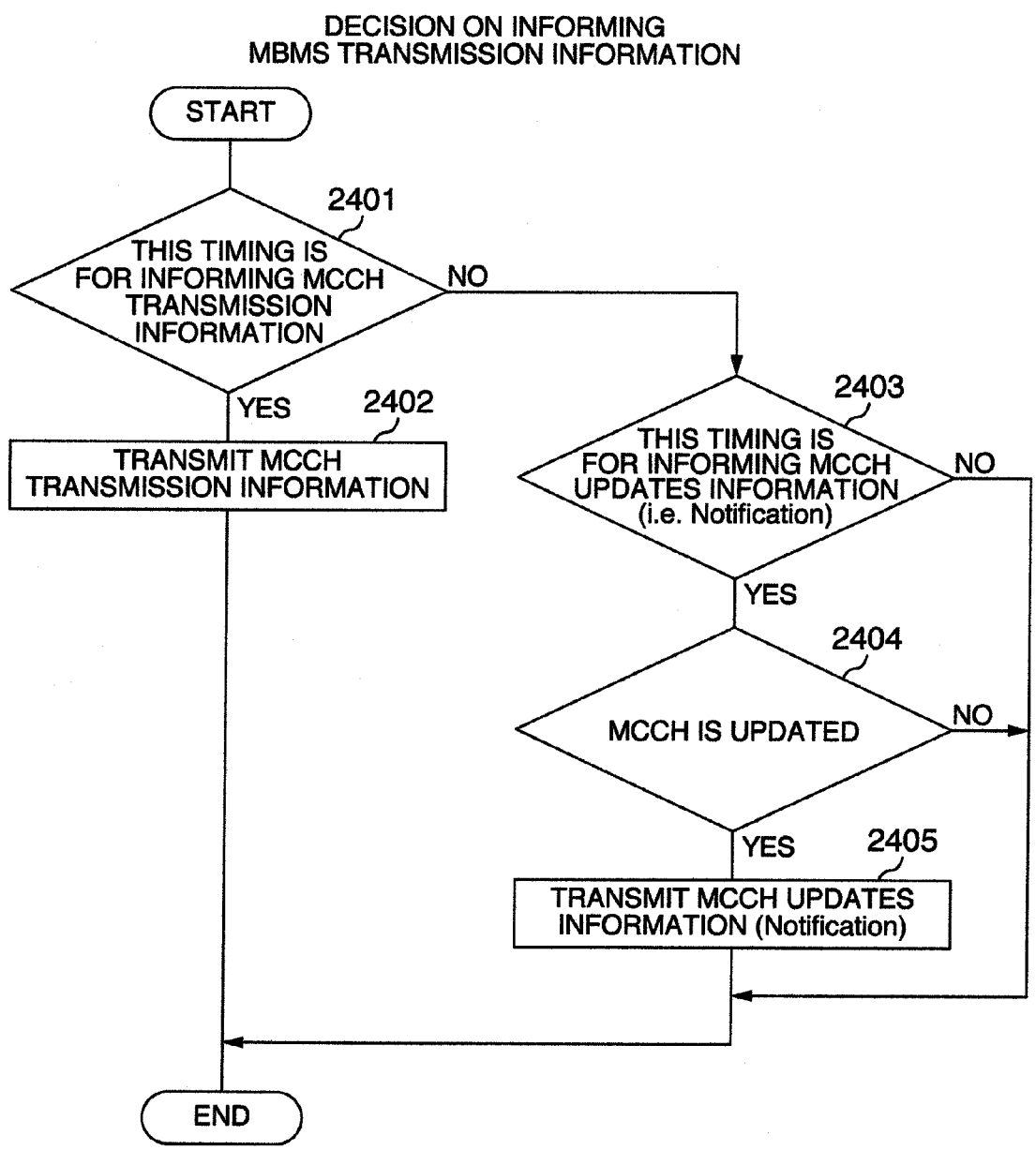
FIG. 24 is a flowchart showing an MBMS transmission information notification decision process for deciding whether or not the MBMS information is notified from the HeNB to the HUE.

FIG. 24 is a flowchart showing an example of a procedure (MBMS transmission information notification decision process) for allowing the HeNB 202 to decide whether or not the transmission of the sequences 2301 and 2302 in FIG. 23 is performed. The process of FIG. 24 has been stored in the memory 301 in FIG. 3 as a program 312 for the MBMS transmission information notification decision process and is executed by the CPU 302 in FIG. 3. In FIG. 24, first, the HeNB 202 determines whether or not the relevant subframe is the transmission timing of the MCCH transmission information by referring to the System information transmission information table 327 (2401). The System information transmission information table 327 includes the information of the transmission subframe of the system information which is transmitted by the HeNB. If it is the transmission timing of the MCCH transmission information, the HeNB 202 transmits the MCCH transmission information to the HUE 210 (2402). If it is not the transmission timing of the MCCH transmission information, the HeNB determines whether or not the relevant subframe is the transmission timing of the Notification (2403). If it is the transmission timing of the Notification, the HeNB confirms the presence or absence of the updating of the MCCH (2404). If the MCCH has been updated, the HeNB transmits the Notification to the HUE (2405). If it is not the transmission timing of the Notification or the MCCH is not updated, the HeNB 202 does not transmit the Notification.

Owing to the embodiment, the HUE 210 can obtain the information necessary to perform the MBMS reception from the HeNB 202 instead of the MeNB. Thus, the HUE 210 can receive the MBMS services which are transmitted from the MeNB.

[Embodiment 4]

The fourth embodiment to which the embodiment of the invention is applied will now be described with reference to FIGS. 25, 26, 27, and 28. In the fourth embodiment, the HeNB 202 selects the information which is notified to the HUE 210 by the HeNB 202 in accordance with the information on MBMS support of the HUE 210 or desired MBMS service information of the HUE 210.

An example in the case where the HeNB 202 selects the MBMS transmission information in accordance with whether or not the HUE 210 supporting the MBMS function will be described with reference to FIGS. 25 and 26.

Figure 25:
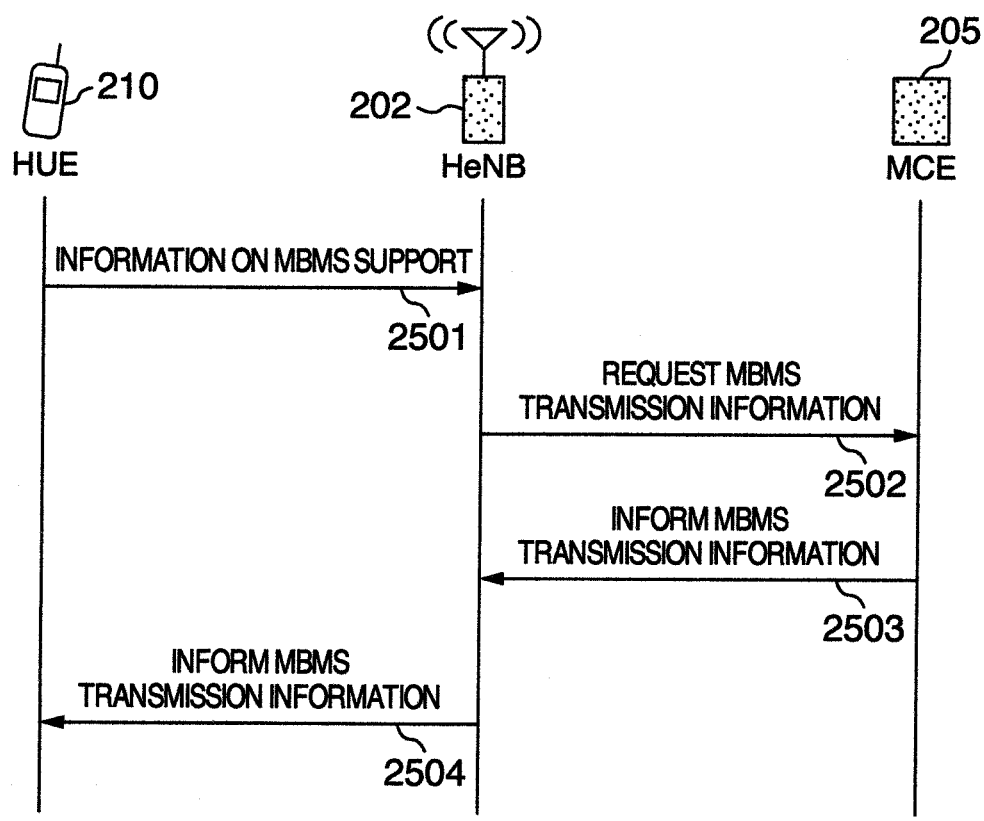
FIG. 25 is a sequence diagram showing a procedure for allowing the MBMS transmission information to be notified from the MCE in accordance with information on MBMS support of the HUE.

FIG. 25 is a sequence diagram showing an example of a procedure for selecting the MBMS transmission information in accordance with the information on MBMS support of the HUE 210. In FIG. 25, in a sequence 2501, the HUE 210 notifies the HeNB 202 of information about whether or not the HeNB itself supporting the MBMS function. The HeNB 202 collects the information on MBMS support from each HUE 210 (for example, 105 in FIG. 1) belonging into the cell (for example, 106 in FIG. 1) of the HeNB 202. The HeNB 202 determines whether or not it is necessary to notify the HUE of the MBMS transmission information on the basis of the collected information on MBMS support.

If it is decided that it is necessary to notify the HUE of the MBMS transmission information, in a sequence 2502, the HeNB 202 requests the MBMS transmission information to the MCE 205. In a sequence 2503, the MCE 205 notifies the HeNB of the MBMS transmission information in response to the request of the MBMS transmission information from the HeNB 202. The notification of the MBMS transmission information from the MCE 205 to the HeNB 202 is made, for example, in accordance with the first embodiment. The HeNB 202 to which the MBMS transmission information has been notified from the MCE 205 notifies the HUE 210 of the MBMS transmission information in a sequence 2504. The notification of the MBMS transmission information from the HeNB 202 to the HUE 210 is made, for example, in accordance with the third embodiment.

Figure 26:
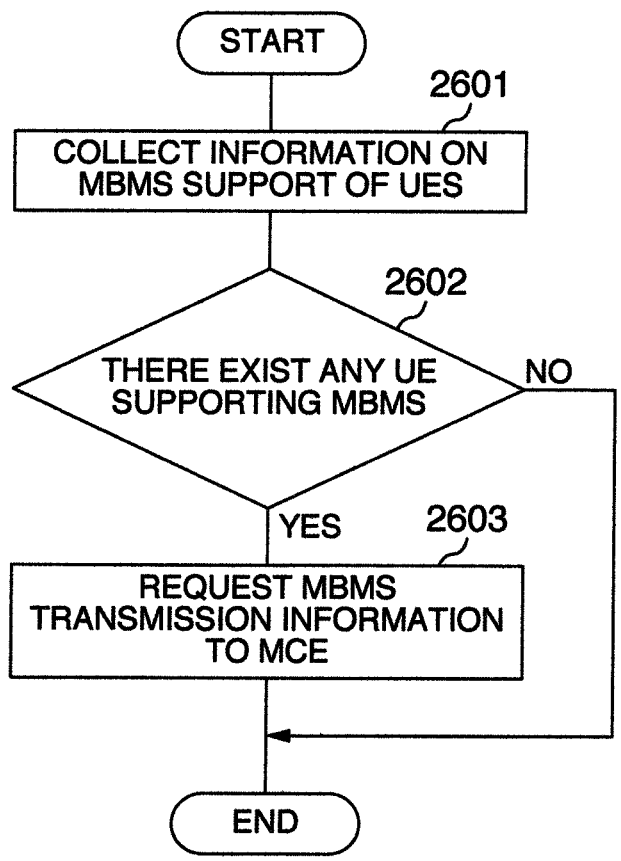
FIG. 26 is a flowchart showing an MBMS transmission information request decision process for allowing the HeNB to request the MBMS transmission information to the MCE in accordance with the information on MBMS support of the HUE.

FIG. 26 is a flowchart showing an example of a procedure (MBMS transmission information request decision process) for allowing the HeNB to decide whether or not the HeNB requests the MBMS transmission information in accordance with the information on MBMS support of the HUE. The process of FIG. 26 has been stored in the memory 301 in FIG. 3 as a program 311 for the MBMS transmission information request decision process and is executed in the CPU 302 in FIG. 3. In FIG. 26, the HeNB 202 collects the information on MBMS support of the HUE which is transmitted from each HUE 210 in the sequence 2501 (2601). On the basis of the collected information on MBMS support of the HUE, the HeNB 202 determines whether or not the HUE supporting the MBMS function exists in the coverage of the HeNB (2602). If the HUE supporting the MBMS function exists in the coverage of the HeNB, the HeNB 202 requests the MBMS transmission information to the MCE 205 (2603).

Although the HeNB 202 has determined the necessity of the MBMS transmission information in the examples of FIGS. 25 and 26, such a decision may be made by the MCE 205. In such a case, the HeNB 202 transmits the information on MBMS support of the HUE collected from the HUE to the MCE 205.

Subsequently, an example in the case where the HUE 210 selects the MBMS transmission information in accordance with the desired MBMS service will be described with reference to FIGS. 27, 28, and 30.

FIG. 30 shows an example of the desired MBMS services information summary table. The desired MBMS services information summary table of FIG. 30 is a table including a service index and a service name of the MBMS services which one of the UEs existing in the coverage of the HeNB desires. FIG. 27 is a sequence diagram showing an example of a procedure for selecting the MBMS transmission information in accordance with the desired MBMS service information which the HUE desires.

Figure 27:
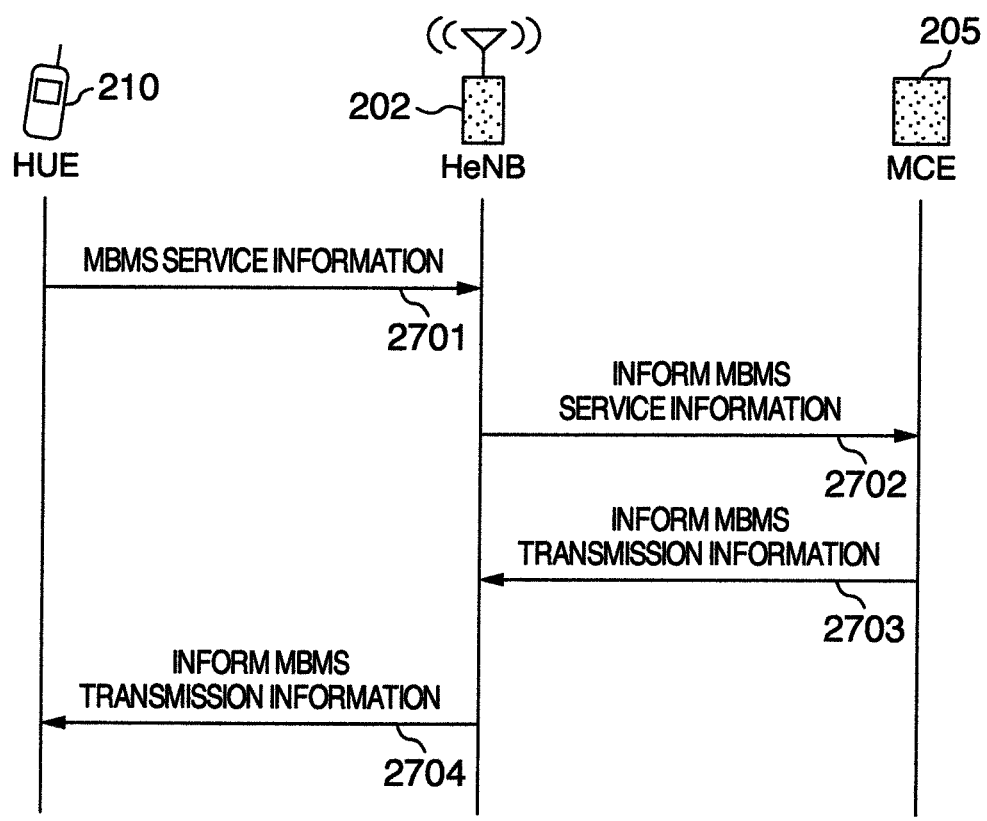
FIG. 27 is a sequence diagram showing a procedure for allowing the MBMS transmission information to be notified from the MCE in accordance with desired MBMS service information.

In FIG. 27, in a sequence 2701, the HUE 210 notifies the HeNB 202 of its own desired MBMS service in a format of, for example, the service index from the memory in which the Desired MBMS service information table 2925 has been stored. The HeNB 202 collects the Desired MBMS service information from each UE belonging to the femto-cell 106 of the HeNB 202 and stores into the Desired MBMS services information summary table 326. In a sequence 2702, the HeNB 202 notifies the MCE 205 of the information of the Desired MBMS services information summary table 326. In a sequence 2703, the MCE 205 notifies the HeNB 202 of the MBMS transmission information corresponding to the desired MBMS service in accordance with the desired MBMS service information notified from the HeNB 202. The notification of the MBMS transmission information from the MCE to the HeNB in the sequence 2703 is made, for example, in accordance with the first embodiment. The HeNB 202 to which the MBMS transmission information corresponding to the desired MBMS service has been notified from the MCE 205 notifies the HUE 210 of the MBMS transmission information in a sequence 2704. The notification of the MBMS transmission information from the HeNB to the HUE is made, for example, in accordance with the third embodiment.

Figure 28:
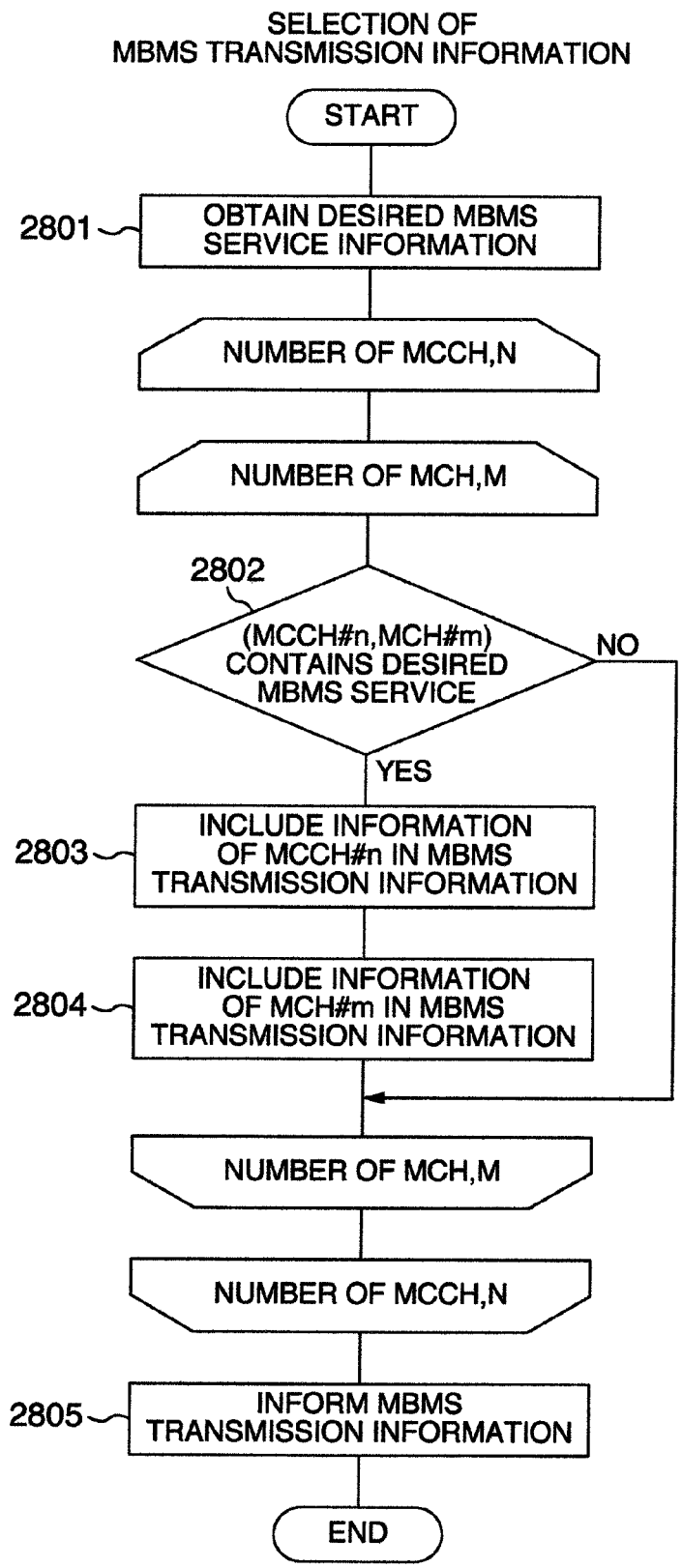
FIG. 28 is a flowchart showing an MBMS transmission information selecting process for selecting the MBMS transmission information which is notified to the HeNB by the MCE in accordance with the desired MBMS service information.

FIG. 28 is a flowchart showing a procedure (MBMS transmission information selecting process) for deciding the MBMS transmission information which is notified to the HeNB 202 from the MCE 205 in accordance with the desired MBMS service information. The process of FIG. 28 has been stored in the memory 401 in FIG. 4 as an a program 412 for the MBMS transmission information selecting process. The CPU 402 in FIG. 4 reads out such a program and executes the flowchart shown in FIG. 28. In FIG. 28, in the sequence 2702, the MCE 205 obtains the desired MBMS service information from the HeNB 202 (2801). Subsequently, the MCE 205 determines whether or not the obtained desired MBMS service is included in each MCCH and each MCH (2802). If the desired MBMS service is included, the information regarding the relevant MCCH and the relevant MCH is allowed to be included in the MBMS transmission information which is notified to the HeNB 202 from the MCE 205 (MCCH: 2803, MCH: 2804). On the basis of results obtained by executing the processes of 2802 to 2804 with respect to each MCCH and each MCH, the MCE 205 notifies the HeNB 202 of the MBMS transmission information corresponding to the desired MBMS service (2805).

In the examples of FIGS. 27 and 28, although the MCE 205 has selected the MBMS information which is transmitted, the HeNB 202 may select the MBMS information which is transmitted.

According to the embodiment, whether or not the MBMS transmission information is notified to the HeNB from the MCE may be selected in accordance with a situation of the HUE which is connected to the HeNB like a first embodiment. For example, if the HUE which desires the MBMS service reception does not exist, by stopping the notification of the MBMS transmission information from the MCE to the HeNB, an amount of data communication is reduced, thereby improving use efficiency of the network.

On the other hand, according to the embodiment, whether or not the MBMS transmission information is notified to the HUE from the HeNB may be selected in accordance with a situation of the HUE which is connected to the HeNB like a third embodiment. For example, if the HUE which desires the MBMS service reception does not exist, by stopping the notification of the MBMS transmission information from the HeNB to the HUE, an amount of data communication is reduced, thereby improving use efficiency of the radio resources.

Further, according to the embodiment, whether or not the HeNB suspends the transmission in the MBMS transmission subframe can be selected in accordance with a situation of the HUE which is connected to the HeNB like a second embodiment. For example, if the HUE which desires the MBMS service reception does not exist, the HeNB does not suspend the transmission in the MBMS transmission subframe but executes the transmission of the unicast data, thereby improving the use efficiency of the radio resources.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication system comprising:
a first base station configured to perform a multicast transmission to a plurality of terminals configured to receive the multicast transmission; and
a second base station which is configured to perform unicast transmission to at least one of the terminals and not to perform the multicast transmission,
wherein, on the basis of a first time slot in a timing of operation of the first base station in which the first base station performs the multicast transmission, said second base station controls communication to the at least one terminal, which is executed by said second base station, so as not to perform a unicast transmission to the at least one terminal in a time slot in the timing of operation of the second base station corresponding to said first time slot in the timing operation of the first base station, thereby suspending the unicast transmission during said time slot in the timing of operation of the second base station, and in the case of a second time slot in the timing of operation of the second base station does not correspond to said first time slot, the unicast data transmission is performed by the second base station in said second time slot.

2. A system according to claim 1, further comprising a multicast control station for indicating the first time slot in which the multicast transmission is performed by the first base station, and wherein said multicast control station notifies the second base station of said first time slot in which the first base station performs the multicast transmission.

3. A system according to claim 2, wherein the first time slot which is notified to the second base station by the multicast control station is defined in an allocation pattern format of the first time slot allocated for the multicast transmission, and said time slot allocation pattern includes a radio frame allocation period constructed by a plurality of continuous time slots, a time offset of the radio frame allocation, and information of the time slot allocation in the radio frame.

4. A system according to claim 1, wherein the first base station notifies the second base station of the first time slot in which the first base station performs the multicast transmission.

5. A system according to claim 4, wherein the first time slot which is notified to the second base station by the multicast control station is defined in an allocation pattern format of the time slot allocated for the multicast transmission, and said time slot allocation pattern includes a radio frame allocation period constructed by a plurality of continuous time slots, a time offset of the radio frame allocation, and information of the time slot allocation in the radio frame.

6. A system according to claim 1, wherein the second base station performs an allocation of radio resources in order to communicate with the at least one terminal connected to the second base station, and the second base station excludes the radio resources of the time slot in the timing of the operation of the second base station in which the first base station performs the multicast transmission from the radio resource serving as a target radio resource.

7. A wireless communication system comprising:
a first base station configured to perform a multicast transmission to a plurality of terminals configured to receive the multicast transmission; and
a second base station which is configured to perform unicast transmission to at least one of the terminals and not to perform the multicast transmission,
wherein the second base station notifies the at least one terminal connected to the second base station of a first time slot in which the first base station performs the multicast transmission, and
wherein, on the basis of the first time slot in a timing of operation of the first base station in which the first base station performs the multicast transmission, said second base station controls communication to the at least one terminal, which is executed by said second base station, so as not to perform a unicast transmission to the at least one terminal in a time slot in the timing of operation of the second base station corresponding to said first time slot in the timing operation of the first base station, thereby suspending the unicast transmission during said time slot in the timing of operation of the second base station, and in the case of a second time slot in the timing of operation of the second base station does not correspond to said first time slot, the unicast data transmission is performed by the second base station in said second time slot.

8. A system according to claim 7, further comprising a multicast control station for indicating the first time slot in which the multicast transmission is performed to the first base station, and wherein said multicast control station notifies the second base station of said first time slot in which the first base station performs the multicast transmission.

9. A system according to claim 7, wherein the first time slot which is notified to the second base station by the multicast control station is a time slot in which multicast control information in information which is multicast transmitted by the first base station is transmitted, the first time slot is defined in an allocation pattern format of the time slot allocated for transmission of the multicast control information, and said first time slot allocation pattern includes a radio frame allocation period constructed by a plurality of continuous time slots, a time offset of the radio frame allocation, an updating period of the multicast control information, and information of the time slot allocation in the radio frame.

10. A system according to claim 7, wherein the first time slot which is notified to the second base station by the multicast control station is a time slot in which multicast control information in information which is multicast transmitted by the first base station is transmitted, and the second base station notifies the terminal connected to the second base station of an updating of said multicast control information.

11. A second base station in which a range of communication with a terminal overlaps with a communication range of a first base station which performs a multicast transmission, wherein the second base station is configured to perform a unicast transmission the terminal, comprising:

an obtaining unit for obtaining information regarding a first time slot in a timing of operation of the first base station in which said multicast transmission is performed; and a control unit for controlling the communication with said terminal in a time slot in the timing of operation of the second base station corresponding to said obtained first time slot, wherein the control unit determines whether or not the time slot in the timing of operation of the second base station is a time slot corresponding to the first time slot in which said multicast transmission is performed, and, if it is the corresponding time slot, a unicast data transmission is not performed in the time slot in the timing of operation of the second base station corresponding to the first time slot in which said multicast transmission is performed, and in the case of a second time slot in the timing of operation of the second base station does not correspond to said first time slot, the unicast data transmission is performed by the second base station in said second time slot.

12. A second base station according to claim 11, wherein I said obtaining unit obtains information regarding the first time slot in which said first base station performs the multicast transmission from a multicast control apparatus for performing scheduling of the multicast transmission in said first base station.

* * * * *